US011563967B2

(12) United States Patent
Hendry et al.

(10) Patent No.: US 11,563,967 B2
(45) Date of Patent: Jan. 24, 2023

(54) ON INTRA RANDOM ACCESS POINT PICTURES AND LEADING PICTURES IN VIDEO CODING

(71) Applicant: Huawei Technologies Co., Ltd., Shenzhen (CN)

(72) Inventors: F N U Hendry, San Diego, CA (US); Ye-Kui Wang, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/358,491

(22) Filed: Jun. 25, 2021

(65) Prior Publication Data

US 2021/0392361 A1 Dec. 16, 2021

Related U.S. Application Data

(63) Continuation of application No. PCT/US2019/068324, filed on Dec. 23, 2019.
(Continued)

(51) Int. Cl.
*H04N 19/46* (2014.01)
*H04N 19/172* (2014.01)
(Continued)

(52) U.S. Cl.
CPC ........... *H04N 19/46* (2014.11); *H04N 19/172* (2014.11); *H04N 19/188* (2014.11); *H04N 19/593* (2014.11)

(58) Field of Classification Search
CPC ......... H04L 65/70; H04L 65/80; H04N 19/46; H04N 19/172; H04N 19/188;
(Continued)

(56) References Cited

U.S. PATENT DOCUMENTS

2014/0079140 A1\* 3/2014 Wang ...................... H04N 19/85
375/240.26
2014/0355616 A1\* 12/2014 Coban ..................... H04N 19/46
370/395.1
2015/0016546 A1\* 1/2015 Wang .................... H04N 19/597
375/240.26

FOREIGN PATENT DOCUMENTS

KR 102246634 B1 \* 10/2013
WO WO-2015095706 A1 \* 6/2015 ........... H04N 19/463

OTHER PUBLICATIONS

Wenger, S., "RTP Payload Format for Scalable Video Coding," RFC 6190, May 2011, 100 pages.
(Continued)

*Primary Examiner* — Maria E Vazquez Colon
(74) *Attorney, Agent, or Firm* — Conley Rose, P.C.

(57) ABSTRACT

A method of encoding a video bitstream implemented by a video encoder is disclosed. The method includes storing, in a memory of the video encoder, a set of less than five network abstraction layer (NAL) unit types available for video data; selecting, by a processor of the video encoder, a NAL unit type from the set of less than five NAL unit types for a picture from the video data; generating, by the processor of the video encoder, a video bitstream containing a NAL unit corresponding to the NAL unit type selected and containing an identifier identifying the NAL unit type selected; and transmitting, by a transmitter of the video encoder, the video bitstream toward a video decoder. A corresponding method of decoding the video bitstream is also disclosed.

8 Claims, 10 Drawing Sheets

Related U.S. Application Data

(60) Provisional application No. 62/785,515, filed on Dec. 27, 2018.

(51) Int. Cl.
*H04N 19/169* (2014.01)
*H04N 19/593* (2014.01)

(58) Field of Classification Search
CPC .. H04N 19/593; H04N 19/107; H04N 19/114; H04N 19/159; H04N 19/184; H04N 19/423; H04N 19/70
See application file for complete search history.

(56) References Cited

OTHER PUBLICATIONS

Wenger, S., et al., "RTP Payload Format for H.264 Video," RFC 3984, Feb. 2005, 83 pages.
Wien, M., HEVC Picture Types, High Efficiency Video Coding, Jan. 10, 2015, 2 pages.
"Line Transmission of Non-Telephone Signals Video Codec for Audiovisual Services at px64 kbits," ITU-T Recommendation H.261, Mar. 1993, 29 pages.
"Transmission of Non-Telephone Signals; Information Technology—Generic Coding of Moving Pictures and Associated Audio Information: Video," ITU-T Recommendation H.262, Jul. 1995, 211 pages.
"Series H: Audiovisual and Multimedia Systems; Infrastructure of audiovisual services—Coding of moving Video; Video coding for low bit rate communication," ITU-T Recommendation H.263, Jan. 2005, 226 pages.
"Series H: Audiovisual and Multimedia Systems; Infrastructure of audiovisual services—Coding of moving video; Advanced video coding for generic audiovisual services," Recommendation ITU-T H.264, Jun. 2019, 836 pages.
"Series H: Audiovisual and Multimedia Systems; Infrastructure of audiovisual services—Coding of moving video; High efficiency video coding" Recommendation ITU-T H.265, Apr. 2013, 317 pages.
Document: JVET-L1001-v5, "Versatile Video Coding (Draft 3)," Joint Video Experts Team (JVET) of ITU-T SG 16 WP 3 and ISO/IEC JTC 1/SC 29/WG 11, 12th Meeting: Macao, CN, Oct. 3-12, 2018, 193 pages.
Document: JVET-L0114-v1, "On slicing and tiling in VVC," Joint Video Experts Team (JVET) of ITU-T SG 16 WP 3 and ISO/IEC JTC 1/SC 29/WG 11, 12th Meeting: Macao, CN, Oct. 3-12, 2018, 5 pages.
Document: JCTVC-AC1005-v2, "HEVC Additional Supplemental Enhancement Information (Draft 4)," Joint Collaborative Team on Video Coding (JCT-VC) of ITU-T SG 16 WP 3 and ISO/IEC JTC 1/SC 29/WG 11, 29th Meeting: Macao, CN, Oct. 19-25, 2017, 56 pages.
Document: JVET-L0686-v2, "Spec text for the agreed starting point on slicing and tiling," Joint Video Experts Team (JVET) of ITU-T SG 16 WP 3 and ISO/IEC JTC 1/SC 29/WG 11, 12th Meeting: Macao, CN, Oct. 3-12, 2018, 1 page.
"Information technology—Coding of audio—visual objects—Part 12: ISO base media file format," ISO/IEC 14496-12, Fifth edition, Dec. 15, 2015, 248 pages.
"Information technology—Coding of audio—visual objects—Part 14: MP4 file format," ISO/IEC 14496-14, Second edition, Nov. 2018, 22 pages.
"Information technology—Coding of audio—visual objects—Part 15: Advanced Video Coding (AVC) file format," ISO/IEC 14496-15, First edition, Apr. 15, 2004, 29 pages.

\* cited by examiner

ON INTRA RANDOM ACCESS POINT PICTURES AND LEADING PICTURES IN VIDEO CODING

CROSS-REFERENCE TO RELATED APPLICATIONS

This application is a continuation of International Application No. PCT/US2019/068324 filed on Dec. 23, 2019, by Futurewei Technologies, Inc., and titled "On Intra Random Access Point Pictures and Leading Pictures in Video Coding," which claims the benefit of U.S. Provisional Patent Application No. 62/785,515 filed Dec. 27, 2018, by Fnu Hendry et al., and titled "On Intra Random Access Point Pictures and Leading Pictures in Video Coding," which are hereby incorporated by reference in their entireties.

TECHNICAL FIELD

In general, this disclosure describes techniques for handling network abstraction layer (NAL) unit types for leading and intra random access point (IRAP) pictures. More specifically, this disclosure describes techniques for limiting the number of available NAL unit types and for using flags to indicate whether a picture is decodable or not when the pictures have not been identified by NAL unit type.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

A first aspect relates to a method of encoding a video bitstream implemented by a video encoder. The method includes storing, in a memory of the video encoder, a set of less than five network abstraction layer (NAL) unit types available for video data; selecting, by a processor of the video encoder, a NAL unit type from the set of less than five NAL unit types for a picture from the video data; generating, by the processor of the video encoder, a video bitstream containing a NAL unit corresponding to the NAL unit type selected and containing an identifier identifying the NAL unit type selected; and transmitting, by a transmitter of the video encoder, the video bitstream toward a video decoder.

The method provides techniques that restrict a set of NAL unit types available for video data to five or less (e.g., restrict the number of NAL unit types to four) specific NAL unit types. This allows leading and trailing pictures (a.k.a., non-IRAP pictures) to share the same NAL unit type. This also allows NAL unit types to indicate whether or not an I-RAP picture is associated with a RADL picture and/or a RASL picture. In addition, the specific NAL unit types can be mapped to different SAP types in DASH. By restricting the set of NAL unit types, the coder/decoder (a.k.a., "codec") in video coding is improved (e.g., utilizes less bits, demands less bandwidth, is more efficient, etc.) relative to current codecs. As a practical matter, the improved video coding process offers the user a better user experience when videos are sent, received, and/or viewed.

In a first implementation form of the method according to the first aspect as such, the set of less than five network abstraction layer (NAL) unit types contains a leading and trailing pictures NAL unit type, an intra random access point (IRAP) with random access skipped leading (RASL) NAL unit type, an IRAP with random access decodable leading (RADL) NAL unit type, and an IRAP with no leading pictures NAL unit type.

In a second implementation form of the method according to the first aspect as such or any preceding implementation form of the first aspect, the set of less than five network abstraction layer (NAL) unit types consists of a leading and trailing pictures NAL unit type, an intra random access point (IRAP) with random access skipped leading (RASL) NAL unit type, an IRAP with random access decodable leading (RADL) NAL unit type, and an IRAP with no leading pictures NAL unit type.

In a third implementation form of the method according to the first aspect as such or any preceding implementation form of the first aspect, both leading and trailing pictures are assigned the leading and trailing pictures NAL unit type.

In a fourth implementation form of the method according to the first aspect as such or any preceding implementation form of the first aspect, the IRAP with RASL NAL unit type is selected for an IRAP picture that is followed by one or more RASL pictures and zero or more RADL pictures in decoding order.

In a fifth implementation form of the method according to the first aspect as such or any preceding implementation form of the first aspect, the IRAP picture is referred to as a clean random access (CRA) picture.

In a sixth implementation form of the method according to the first aspect as such or any preceding implementation form of the first aspect, the IRAP with RASL NAL unit type is referred to as a clean random access (CRA) NAL unit type.

In a seventh implementation form of the method according to the first aspect as such or any preceding implementation form of the first aspect, the IRAP with RASL NAL unit type is designated IRAP_W_RASL.

In an eighth implementation form of the method according to the first aspect as such or any preceding implementation form of the first aspect, the IRAP_W_RASL designation corresponds to stream access point (SAP) type 3 in dynamic adaptive streaming over hypertext transfer protocol (DASH).

In a ninth implementation form of the method according to the first aspect as such or any preceding implementation form of the first aspect, the IRAP with RADL NAL unit type is selected for an IRAP picture that is followed by one or more RADL pictures and zero RADL pictures in decoding order.

In a tenth implementation form of the method according to the first aspect as such or any preceding implementation form of the first aspect, the IRAP picture is referred to as an instantaneous decoder refresh (IDR) picture with RADL picture.

In an eleventh implementation form of the method according to the first aspect as such or any preceding implementation form of the first aspect, the IRAP with RADL NAL unit type is referred to as an instantaneous decoder refresh (IDR) with RADL NAL unit type.

In a twelfth implementation form of the method according to the first aspect as such or any preceding implementation form of the first aspect, the IRAP with RADL NAL unit type is designated IRAP_W_RADL.

In a thirteenth implementation form of the method according to the first aspect as such or any preceding implementation form of the first aspect, the IRAP_W_RADL corresponds to stream access point (SAP) type 2 in dynamic adaptive streaming over hypertext transfer protocol (DASH).

In a fourteenth implementation form of the method according to the first aspect as such or any preceding implementation form of the first aspect, the IRAP with no leading pictures NAL unit type is selected for an IRAP picture that is not followed by a leading picture in decoding order.

In a fifteenth implementation form of the method according to the first aspect as such or any preceding implementation form of the first aspect, the IRAP picture is referred to as an instantaneous decoder refresh (IDR) picture without a leading picture.

In a sixteenth implementation form of the method according to the first aspect as such or any preceding implementation form of the first aspect, the IRAP with no leading pictures NAL unit type is referred to as an instantaneous decoder refresh (IDR) without leading pictures NAL unit type.

In a seventeenth implementation form of the method according to the first aspect as such or any preceding implementation form of the first aspect, the IRAP with no leading pictures NAL unit type is designated IRAP_N_LP.

In an eighteenth implementation form of the method according to the first aspect as such or any preceding implementation form of the first aspect, the IRAP_N_LP designation corresponds to stream access point (SAP) type 1 in dynamic adaptive streaming over hypertext transfer protocol (DASH).

A second aspect relates to method of decoding a coded video bitstream implemented by a video decoder. The method includes storing, in a memory of the video decoder, a set of less than five network abstraction layer (NAL) unit types available for video data; receiving, by a receiver of the video decoder, a coded video bitstream containing a NAL unit and an identifier; determining, by a processor of the video decoder, a NAL unit type from the set of less than five NAL unit types used to encode the NAL unit based on the identifier; and assigning, by the processor of the video decoder, a presentation order for pictures contained in the NAL unit based on the NAL unit type determined.

The method provides techniques that restrict a set of NAL unit types available for video data to five or less (e.g., restrict the number of NAL unit types to four) specific NAL unit types. This allows leading and trailing pictures (a.k.a., non-IRAP pictures) to share the same NAL unit type. This also allows NAL unit types to indicate whether or not an I-RAP picture is associated with a RADL picture and/or a RASL picture. In addition, the specific NAL unit types can be mapped to different SAP types in DASH. By restricting the set of NAL unit types, the coder/decoder (a.k.a., "codec") in video coding is improved (e.g., utilizes less bits, demands less bandwidth, is more efficient, etc.) relative to current codecs. As a practical matter, the improved video coding process offers the user a better user experience when videos are sent, received, and/or viewed.

In a first implementation form of the method according to the second aspect as such, the set of less than five network abstraction layer (NAL) unit types contains a leading and trailing pictures NAL unit type, an intra random access point (IRAP) with random access skipped leading (RASL) NAL unit type, an IRAP with random access decodable leading (RADL) NAL unit type, and an IRAP with no leading pictures NAL unit type.

In a second implementation form of the method according to the second aspect as such or any preceding implementation form of the second aspect, the set of less than five network abstraction layer (NAL) unit types consists of a leading and trailing pictures NAL unit type, an intra random access point (IRAP) with random access skipped leading (RASL) NAL unit type, an IRAP with random access decodable leading (RADL) NAL unit type, and an IRAP with no leading pictures NAL unit type.

In a third implementation form of the method according to the second aspect as such or any preceding implementation form of the second aspect, both leading and trailing pictures are assigned the leading and trailing pictures NAL unit type.

In a fourth implementation form of the method according to the second aspect as such or any preceding implementation form of the second aspect, the IRAP with RASL NAL unit type is determined for an IRAP picture that is followed by one or more RASL pictures and zero or more RADL pictures in decoding order.

In a fifth implementation form of the method according to the second aspect as such or any preceding implementation form of the second aspect, the IRAP picture is referred to as a clean random access (CRA) picture.

In a sixth implementation form of the method according to the second aspect as such or any preceding implementation form of the second aspect, the IRAP with RASL NAL unit type is referred to as a clean random access (CRA) NAL unit type.

In a seventh implementation form of the method according to the second aspect as such or any preceding implementation form of the second aspect, the IRAP with RASL NAL unit type is designated IRAP_W_RASL.

In an eighth implementation form of the method according to the second aspect as such or any preceding implementation form of the second aspect, the IRAP_W_RASL designation corresponds to stream access point (SAP) type 3 in dynamic adaptive streaming over hypertext transfer protocol (DASH).

In a ninth implementation form of the method according to the second aspect as such or any preceding implementation form of the second aspect, the IRAP with RADL NAL unit type is determined for an IRAP picture that is followed by one or more RADL pictures and zero RADL pictures in decoding order.

In a tenth implementation form of the method according to the second aspect as such or any preceding implementation form of the second aspect, the IRAP picture is referred to as an instantaneous decoder refresh (IDR) picture with RADL picture.

In an eleventh implementation form of the method according to the second aspect as such or any preceding implementation form of the second aspect, the IRAP with RADL NAL unit type is referred to as an instantaneous decoder refresh (IDR) with RADL NAL unit type.

In a twelfth implementation form of the method according to the second aspect as such or any preceding implementation form of the second aspect, the IRAP with RADL NAL unit type is designated IRAP_W_RADL.

In a thirteenth implementation form of the method according to the second aspect as such or any preceding implementation form of the second aspect, the IRAP_W_RADL corresponds to stream access point (SAP) type 2 in dynamic adaptive streaming over hypertext transfer protocol (DASH).

In a fourteenth implementation form of the method according to the second aspect as such or any preceding implementation form of the second aspect, the IRAP with no leading pictures NAL unit type is determined for an IRAP picture that is not followed by a leading picture in decoding order.

In a fifteenth implementation form of the method according to the second aspect as such or any preceding implementation form of the second aspect, the IRAP picture is referred to as an instantaneous decoder refresh (IDR) picture without a leading picture.

In a sixteenth implementation form of the method according to the second aspect as such or any preceding implementation form of the second aspect, the IRAP with no leading pictures NAL unit type is referred to as an instantaneous decoder refresh (IDR) without leading pictures NAL unit type.

In a seventeenth implementation form of the method according to the second aspect as such or any preceding implementation form of the second aspect, the IRAP with no leading pictures NAL unit type is designated IRAP_N_LP.

In an eighteenth implementation form of the method according to the second aspect as such or any preceding implementation form of the second aspect, the IRAP_N_LP designation corresponds to stream access point (SAP) type 1 in dynamic adaptive streaming over hypertext transfer protocol (DASH).

A third aspect relates to an encoding device. The encoding device includes a memory containing instructions and a set of less than five network abstraction layer (NAL) unit types available for video data; a processor coupled to the memory, the processor configured to implement the instructions to cause the encoding device to: select a NAL unit type from the set of less than five NAL unit types for a picture from the video data; and generate a video bitstream containing a NAL unit corresponding to the NAL unit type selected and containing an identifier identifying the NAL unit type selected; and a transmitter coupled to the processor, the transmitter configured to transmit the video bitstream toward a video decoder.

The encoding device provides techniques that restrict a set of NAL unit types available for video data to five or less (e.g., restrict the number of NAL unit types to four) specific NAL unit types. This allows leading and trailing pictures (a.k.a., non-IRAP pictures) to share the same NAL unit type. This also allows NAL unit types to indicate whether or not an I-RAP picture is associated with a RADL picture and/or a RASL picture. In addition, the specific NAL unit types can be mapped to different SAP types in DASH. By restricting the set of NAL unit types, the coder/decoder (a.k.a., "codec") in video coding is improved (e.g., utilizes less bits, demands less bandwidth, is more efficient, etc.) relative to current codecs. As a practical matter, the improved video coding process offers the user a better user experience when videos are sent, received, and/or viewed.

In a first implementation form of the encoding device according to the third aspect as such, the set of less than five network abstraction layer (NAL) unit types contains a leading and trailing pictures NAL unit type; an intra random access point (IRAP) with random access skipped leading (RASL) NAL unit type, an IRAP with random access decodable leading (RADL) NAL unit type, and an IRAP with no leading pictures NAL unit type.

In a second implementation form of the encoding device according to the third aspect as such or any preceding implementation form of the third aspect, the set of less than five network abstraction layer (NAL) unit types consists of a leading and trailing pictures NAL unit type, an intra random access point (IRAP) with random access skipped leading (RASL) NAL unit type, an IRAP with random access decodable leading (RADL) NAL unit type, and an IRAP with no leading pictures NAL unit type.

In a third implementation form of the encoding device according to the third aspect as such or any preceding implementation form of the third aspect, both leading and trailing pictures are assigned the leading and trailing pictures NAL unit type.

In a fourth implementation form of the encoding device according to the third aspect as such or any preceding implementation form of the third aspect, the IRAP with RASL NAL unit type is selected for an IRAP picture that is followed by one or more RASL pictures and zero or more RADL pictures in decoding order.

In a fifth implementation form of the encoding device according to the third aspect as such or any preceding implementation form of the third aspect, the IRAP picture is referred to as a clean random access (CRA) picture.

In a sixth implementation form of the encoding device according to the third aspect as such or any preceding implementation form of the third aspect, the IRAP with RASL NAL unit type is referred to as a clean random access (CRA) NAL unit type.

In a seventh implementation form of the encoding device according to the third aspect as such or any preceding implementation form of the third aspect, the IRAP with RASL NAL unit type is designated IRAP_W_RASL.

In an eighth implementation form of the encoding device according to the third aspect as such or any preceding implementation form of the third aspect, the IRAP_W_RASL designation corresponds to stream access point (SAP) type 3 in dynamic adaptive streaming over hypertext transfer protocol (DASH).

In a ninth implementation form of the encoding device according to the third aspect as such or any preceding implementation form of the third aspect, the IRAP with RADL NAL unit type is selected for an IRAP picture that is followed by one or more RADL pictures and zero RADL pictures in decoding order.

In a tenth implementation form of the encoding device according to the third aspect as such or any preceding implementation form of the third aspect, the IRAP picture is referred to as an instantaneous decoder refresh (IDR) picture with RADL picture.

In an eleventh implementation form of the encoding device according to the third aspect as such or any preceding implementation form of the third aspect, the IRAP with RADL NAL unit type is referred to as an instantaneous decoder refresh (IDR) with RADL NAL unit type.

In a twelfth implementation form of the encoding device according to the third aspect as such or any preceding implementation form of the third aspect, the IRAP with RADL NAL unit type is designated IRAP_W_RADL.

In a thirteenth implementation form of the encoding device according to the third aspect as such or any preceding implementation form of the third aspect, the IRAP_W_RADL corresponds to stream access point (SAP) type 2 in dynamic adaptive streaming over hypertext transfer protocol (DASH).

In a fourteenth implementation form of the encoding device according to the third aspect as such or any preceding implementation form of the third aspect, the IRAP with no leading pictures NAL unit type is selected for an IRAP picture that is not followed by a leading picture in decoding order.

In a fifteenth implementation form of the encoding device according to the third aspect as such or any preceding implementation form of the third aspect, the IRAP picture is referred to as an instantaneous decoder refresh (IDR) picture without a leading picture.

In a sixteenth implementation form of the encoding device according to the third aspect as such or any preceding implementation form of the third aspect, the IRAP with no leading pictures NAL unit type is referred to as an instantaneous decoder refresh (IDR) without leading pictures NAL unit type.

In a seventeenth implementation form of the encoding device according to the third aspect as such or any preceding implementation form of the third aspect, the IRAP with no leading pictures NAL unit type is designated IRAP_N_LP.

In an eighteenth implementation form of the encoding device according to the third aspect as such or any preceding implementation form of the third aspect, the IRAP_N_LP designation corresponds to stream access point (SAP) type 1 in dynamic adaptive streaming over hypertext transfer protocol (DASH).

A fourth aspect relates to a decoding device. The decoding device includes a receiver configured to receive a coded video bitstream containing a NAL unit and an identifier; a memory coupled to the receiver, the memory storing instructions and a set of less than five network abstraction layer (NAL) unit types available for video data; and a processor coupled to the memory, the processor configured to execute the instructions to cause the decoding device to: determine a NAL unit type from the set of less than five NAL unit types used to encode the NAL unit based on the identifier; and assign a presentation order for pictures contained in the NAL unit based on the NAL unit type determined.

The decoding device provides techniques that restrict a set of NAL unit types available for video data to five or less (e.g., restrict the number of NAL unit types to four) specific NAL unit types. This allows leading and trailing pictures (a.k.a., non-IRAP pictures) to share the same NAL unit type. This also allows NAL unit types to indicate whether or not an I-RAP picture is associated with a RADL picture and/or a RASL picture. In addition, the specific NAL unit types can be mapped to different SAP types in DASH. By restricting the set of NAL unit types, the coder/decoder (a.k.a., "codec") in video coding is improved (e.g., utilizes less bits, demands less bandwidth, is more efficient, etc.) relative to current codecs. As a practical matter, the improved video coding process offers the user a better user experience when videos are sent, received, and/or viewed.

In a first implementation form of the decoding device according to the fourth aspect as such, the set of less than five network abstraction layer (NAL) unit types contains a leading and trailing pictures NAL unit type, an intra random access point (IRAP) with random access skipped leading (RASL) NAL unit type, an IRAP with random access decodable leading (RADL) NAL unit type, and an IRAP with no leading pictures NAL unit type.

In a second implementation form of the decoding device according to the fourth aspect as such or any preceding implementation form of the fourth aspect, the set of less than five network abstraction layer (NAL) unit types consists of a leading and trailing pictures NAL unit type, an intra random access point (IRAP) with random access skipped leading (RASL) NAL unit type, an IRAP with random access decodable leading (RADL) NAL unit type, and an IRAP with no leading pictures NAL unit type.

In a third implementation form of the decoding device according to the fourth aspect as such or any preceding implementation form of the fourth aspect, both leading and trailing pictures are assigned the leading and trailing pictures NAL unit type.

In a fourth implementation form of the decoding device according to the fourth aspect as such or any preceding implementation form of the fourth aspect, the IRAP with RASL NAL unit type is selected for an IRAP picture that is followed by one or more RASL pictures and zero or more RADL pictures in decoding order.

In a fifth implementation form of the decoding device according to the fourth aspect as such or any preceding implementation form of the fourth aspect, the IRAP picture is referred to as a clean random access (CRA) picture.

In a sixth implementation form of the decoding device according to the fourth aspect as such or any preceding implementation form of the fourth aspect, the IRAP with RASL NAL unit type is referred to as a clean random access (CRA) NAL unit type.

In a seventh implementation form of the decoding device according to the fourth aspect as such or any preceding implementation form of the fourth aspect, the IRAP with RASL NAL unit type is designated IRAP_W_RASL.

In an eighth implementation form of the decoding device according to the fourth aspect as such or any preceding implementation form of the fourth aspect, the IRAP_W_RASL designation corresponds to stream access point (SAP) type 3 in dynamic adaptive streaming over hypertext transfer protocol (DASH).

In a ninth implementation form of the decoding device according to the fourth aspect as such or any preceding implementation form of the fourth aspect, the IRAP with RADL NAL unit type is selected for an IRAP picture that is followed by one or more RADL pictures and zero RADL pictures in decoding order.

In a tenth implementation form of the decoding device according to the fourth aspect as such or any preceding implementation form of the fourth aspect, the IRAP picture is referred to as an instantaneous decoder refresh (IDR) picture with RADL picture.

In an eleventh implementation form of the decoding device according to the fourth aspect as such or any preceding implementation form of the fourth aspect, the IRAP with RADL NAL unit type is referred to as an instantaneous decoder refresh (IDR) with RADL NAL unit type.

In a twelfth implementation form of the decoding device according to the fourth aspect as such or any preceding implementation form of the fourth aspect, the IRAP with RADL NAL unit type is designated IRAP_W_RADL.

In a thirteenth implementation form of the decoding device according to the fourth aspect as such or any preceding implementation form of the fourth aspect, the IRAP_W_RADL corresponds to stream access point (SAP) type 2 in dynamic adaptive streaming over hypertext transfer protocol (DASH).

In a fourteenth implementation form of the decoding device according to the fourth aspect as such or any preceding implementation form of the fourth aspect, the IRAP with no leading pictures NAL unit type is selected for an IRAP picture that is not followed by a leading picture in decoding order.

In a fifteenth implementation form of the decoding device according to the fourth aspect as such or any preceding implementation form of the fourth aspect, the IRAP picture is referred to as an instantaneous decoder refresh (IDR) picture without a leading picture.

In a sixteenth implementation form of the decoding device according to the fourth aspect as such or any preceding implementation form of the fourth aspect, the IRAP with no leading pictures NAL unit type is referred to as an instantaneous decoder refresh (IDR) without leading pictures NAL unit type.

In a seventeenth implementation form of the decoding device according to the fourth aspect as such or any preceding implementation form of the fourth aspect, the IRAP with no leading pictures NAL unit type is designated IRAP_N_LP.

In an eighteenth implementation form of the decoding device according to the fourth aspect as such or any preceding implementation form of the fourth aspect, the IRAP_N_LP designation corresponds to stream access point (SAP) type 1 in dynamic adaptive streaming over hypertext transfer protocol (DASH).

A fifth aspect relates to a method of encoding a video bitstream implemented by a video encoder. The method includes generating, by a processor of the video encoder, a bitstream containing a NAL unit for a non-intra random access point (non-IRAP) picture associated with an intra random access point (IRAP) picture; setting, by the processor of the video encoder, a first flag in the bitstream to a first value when the NAL unit for the non-IRAP picture comprises a random access decodable leading (RADL) picture; setting, by the processor of the video encoder, a second flag in the bitstream to the first value when the NAL unit for the non-IRAP picture comprises a random access skipped leading (RASL) picture; and transmitting, by a transmitter of the video encoder, the video bitstream toward a video decoder.

The method of encoding provides techniques for when non-IRAP pictures are not identified by the NAL unit type. In such cases, flags in a bitstream are set to a particular value to indicate whether or not an IRAP picture is associated with a RADL picture or a RASL picture.

In a first implementation form of the method according to the fifth aspect as such, the first flag is designated a RadlPictureFlag and the second flag is designated a RaslPictureFlag.

In a second implementation form of the method according to the fifth aspect as such or any preceding implementation form of the fifth aspect, the first value is one (1).

In a third implementation form of the method according to the fifth aspect as such or any preceding implementation form of the fifth aspect, the non-IRAP picture comprises a leading picture.

In a fourth implementation form of the method according to the fifth aspect as such or any preceding implementation form of the fifth aspect, the non-IRAP picture comprises a trailing picture.

In a fifth implementation form of the method according to the fifth aspect as such or any preceding implementation form of the fifth aspect, the first flag is set equal to the first value when a picture order count (POC) value of the non-IRAP picture is less than a POC value of the IRAP picture.

In a sixth implementation form of the method according to the fifth aspect as such or any preceding implementation form of the fifth aspect, the first flag is set equal to the first value when each reference picture list for the non-IRAP picture does not contain any picture other than the IRAP picture associated with the non-IRAP picture or another RADL picture associated with the IRAP picture.

In a seventh implementation form of the method according to the fifth aspect as such or any preceding implementation form of the fifth aspect, the second flag is set equal to the first value when a picture order count (POC) value of the non-IRAP picture is less than a POC value of the IRAP picture.

In an eighth implementation form of the method according to the fifth aspect as such or any preceding implementation form of the fifth aspect, the second flag is set equal to the first value when either reference picture list for the non-IRAP picture contains at least one reference picture that precedes the IRAP picture associated with the non-IRAP picture in decoding order or another RASL picture associated with the IRAP picture.

In a ninth implementation form of the method according to the fifth aspect as such or any preceding implementation form of the fifth aspect, further comprising setting the first flag and the second flag to a second value to indicate that the NAL unit for the non-IRAP picture does not include the RADL picture or the RASL picture.

In a tenth implementation form of the method according to the fifth aspect as such or any preceding implementation form of the fifth aspect, the first flag and the second flag are not both set to the first value for the non-IRAP picture.

A sixth aspect relates to a method of decoding a video bitstream implemented by a video decoder. The method includes receiving, by a receiver of the video decoder, a coded video bitstream containing a first flag, a second flag, and a NAL unit for a non-intra random access point (non-IRAP) picture associated with an intra random access point (IRAP) picture; determining, by a processor of the video decoder, that the NAL unit for the non-IRAP picture comprises a random access decodable leading (RADL) picture when the first flag in the bitstream has been set to a first value; determining, by a processor of the video decoder, that the NAL unit for the non-IRAP picture comprises a random access skipped leading (RASL) picture when the second flag in the bitstream has been set to the first value; and assigning, by the processor of the video decoder, a presentation order for pictures contained in the NAL unit based on the first flag or the second flag having the first value and decoding the NAL unit based on the presentation order assigned.

The method of decoding provides techniques for when non-IRAP pictures are not identified by the NAL unit type. In such cases, flags in a bitstream are set to a particular value to indicate whether or not an IRAP picture is associated with a RADL picture or a RASL picture.

In a first implementation form of the method according to the sixth aspect as such, the first flag is designated a RadlPictureFlag and the second flag is designated a RaslPictureFlag.

In a second implementation form of the method according to the sixth aspect as such or any preceding implementation form of the sixth aspect, the first value is one (1).

In a third implementation form of the method according to the sixth aspect as such or any preceding implementation form of the sixth aspect, the non-IRAP picture comprises a leading picture.

In a fourth implementation form of the method according to the sixth aspect as such or any preceding implementation form of the sixth aspect, the non-IRAP picture comprises a trailing picture.

In a fifth implementation form of the method according to the sixth aspect as such or any preceding implementation form of the sixth aspect, the first flag is set equal to the first value when a picture order count (POC) value of the non-IRAP picture is less than a POC value of the IRAP picture.

In a sixth implementation form of the method according to the sixth aspect as such or any preceding implementation form of the sixth aspect, the first flag is set equal to the first value when each reference picture list for the non-IRAP picture does not contain any picture other than the IRAP picture associated with the non-IRAP picture or another RADL picture associated with the IRAP picture.

In a seventh implementation form of the method according to the sixth aspect as such or any preceding implementation form of the sixth aspect, the second flag is set equal to the first value when a picture order count (POC) value of the non-IRAP picture is less than a POC value of the IRAP picture.

In an eighth implementation form of the method according to the sixth aspect as such or any preceding implementation form of the sixth aspect, the second flag is set equal to the first value when either reference picture list for the non-IRAP picture contains at least one reference picture that precedes the IRAP picture associated with the non-IRAP picture in decoding order or another RASL picture associated with the IRAP picture.

In a ninth implementation form of the method according to the sixth aspect as such or any preceding implementation form of the sixth aspect, further comprising setting the first flag and the second flag to a second value to indicate that the NAL unit for the non-IRAP picture does not include the RADL picture or the RASL picture.

In a tenth implementation form of the method according to the sixth aspect as such or any preceding implementation form of the sixth, the first flag and the second flag are not both set to the first value for the non-IRAP picture.

A seventh aspect relates to a coding apparatus. The coding apparatus comprises a receiver configured to receive a bitstream to decode; a transmitter coupled to the receiver, the transmitter configured to transmit a decoded image to a display; a memory coupled to at least one of the receiver or the transmitter, the memory configured to store instructions; and a processor coupled to the memory, the processor configured to execute the instructions stored in the memory to perform the method in any of any of the embodiments disclosed herein.

The coding apparatus provides techniques that restrict a set of NAL unit types available for video data to five or less (e.g., restrict the number of NAL unit types to four) specific NAL unit types. This allows leading and trailing pictures (a.k.a., non-IRAP pictures) to share the same NAL unit type. This also allows NAL unit types to indicate whether or not an I-RAP picture is associated with a RADL picture and/or a RASL picture. In addition, the specific NAL unit types can be mapped to different SAP types in DASH. By restricting the set of NAL unit types, the coder/decoder (a.k.a., "codec") in video coding is improved (e.g., utilizes less bits, demands less bandwidth, is more efficient, etc.) relative to current codecs. As a practical matter, the improved video coding process offers the user a better user experience when videos are sent, received, and/or viewed.

The coding apparatus also provides techniques for when non-IRAP pictures are not identified by the NAL unit type. In such cases, flags in a bitstream are set to a particular value to indicate whether or not an IRAP picture is associated with a RADL picture or a RASL picture.

An eighth aspect relates to a system. The system includes an encoder; and a decoder in communication with the encoder, wherein the encoder or the decoder includes the decoding device, the encoding device, or the coding apparatus disclosed herein.

The system provides techniques that restrict a set of NAL unit types available for video data to five or less (e.g., restrict the number of NAL unit types to four) specific NAL unit types. This allows leading and trailing pictures (a.k.a., non-IRAP pictures) to share the same NAL unit type. This also allows NAL unit types to indicate whether or not an I-RAP picture is associated with a RADL picture and/or a RASL picture. In addition, the specific NAL unit types can be mapped to different SAP types in DASH. By restricting the set of NAL unit types, the coder/decoder (a.k.a., "codec") in video coding is improved (e.g., utilizes less bits, demands less bandwidth, is more efficient, etc.) relative to current codecs. As a practical matter, the improved video coding process offers the user a better user experience when videos are sent, received, and/or viewed.

The system also provides techniques for when non-IRAP pictures are not identified by the NAL unit type. In such cases, flags in a bitstream are set to a particular value to indicate whether or not an IRAP picture is associated with a RADL picture or a RASL picture.

A ninth aspect relates to a means for coding. The means for coding includes receiving means configured to receive a bitstream to decode; transmission means coupled to the receiving means, the transmission means configured to transmit a decoded image to a display means; storage means coupled to at least one of the receiving means or the transmission means, the storage means configured to store instructions; and processing means coupled to the storage means, the processing means configured to execute the instructions stored in the storage means to perform the methods disclosed herein.

The means for coding provides techniques that restrict a set of NAL unit types available for video data to five or less (e.g., restrict the number of NAL unit types to four) specific NAL unit types. This allows leading and trailing pictures (a.k.a., non-IRAP pictures) to share the same NAL unit type. This also allows NAL unit types to indicate whether or not an I-RAP picture is associated with a RADL picture and/or a RASL picture. In addition, the specific NAL unit types can be mapped to different SAP types in DASH. By restricting the set of NAL unit types, the coder/decoder (a.k.a., "codec") in video coding is improved (e.g., utilizes less bits, demands less bandwidth, is more efficient, etc.) relative to current codecs. As a practical matter, the improved video coding process offers the user a better user experience when videos are sent, received, and/or viewed.

The means for coding also provides techniques for when non-IRAP pictures are not identified by the NAL unit type. In such cases, flags in a bitstream are set to a particular value to indicate whether or not an IRAP picture is associated with a RADL picture or a RASL picture.

BRIEF DESCRIPTION OF THE DRAWINGS

For a more complete understanding of this disclosure, reference is now made to the following brief description.

DETAILED DESCRIPTION

The following are various acronyms employed herein: Coding Tree Block (CTB), Coding Tree Unit (CTU), Coding Unit (CU), Coded Video Sequence (CVS), Joint Video Experts Team (JVET), Motion-Constrained Tile Set (MCTS), Maximum Transfer Unit (MTU), Network Abstraction Layer (NAL), Picture Order Count (POC), Picture Parameter Set (PPS), Raw Byte Sequence Payload (RBSP), Sequence Parameter Set (SPS), Versatile Video Coding (VVC), and Working Draft (WD).

Figure 1:
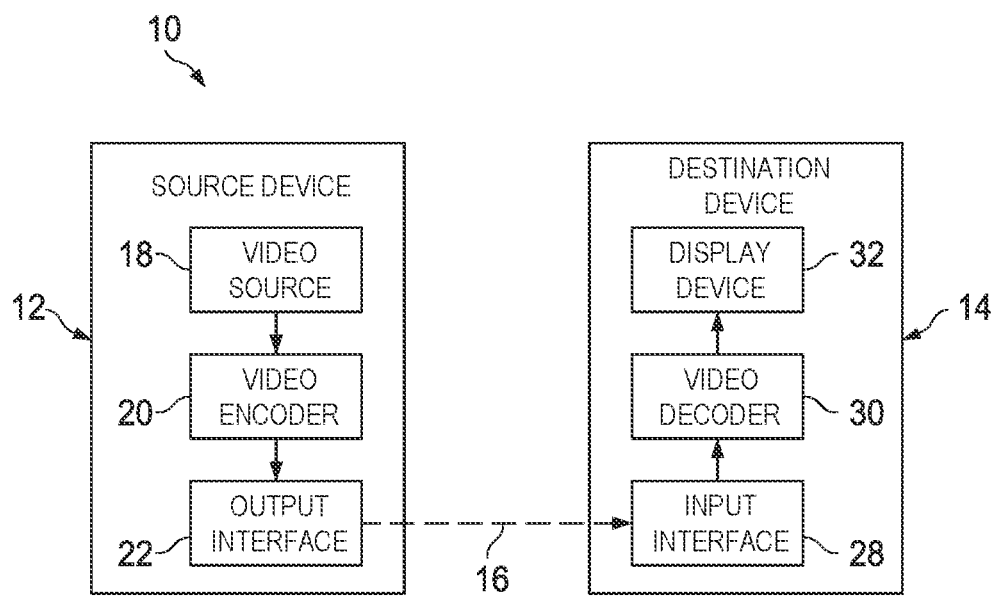
FIG. 1 is a block diagram illustrating an example coding system that may utilize bi-lateral prediction techniques.

FIG. 1 is a block diagram illustrating an example coding system 10 that may utilize video coding techniques as described herein. As shown in FIG. 1, the coding system 10 includes a source device 12 that provides encoded video data to be decoded at a later time by a destination device 14. In particular, the source device 12 may provide the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, digital video disks (DVD)s, Compact Disc Read-Only Memories (CD-ROMs), flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, coding system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of the source device 12 and/or the video decoder 30 of the destination device 14 may be configured to apply the techniques for video coding. In other examples, a source device and a destination device may include other components or arrangements. For example, source device 12 may receive video data from an external video source, such as an external camera. Likewise, destination device 14 may interface with an external display device, rather than including an integrated display device.

The illustrated coding system 10 of FIG. 1 is merely one example. Techniques for video coding may be performed by any digital video encoding and/or decoding device.

Although the techniques of this disclosure generally are performed by a video coding device, the techniques may also be performed by a video encoder/decoder, typically referred to as a "CODEC." Moreover, the techniques of this disclosure may also be performed by a video preprocessor. The video encoder and/or the decoder may be a graphics processing unit (GPU) or a similar device.

Source device 12 and destination device 14 are merely examples of such coding devices in which source device 12 generates coded video data for transmission to destination device 14. In some examples, source device 12 and destination device 14 may operate in a substantially symmetrical manner such that each of the source and destination devices 12, 14 includes video encoding and decoding components. Hence, coding system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video.

In some cases, when video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., group of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the International Telecommunications Union Telecommunication Standardization Sector (ITU-T) H.264 standard, alternatively referred to as Moving Picture Expert Group (MPEG)-4, Part 10, Advanced Video Coding (AVC), H.265/HEVC, or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate multiplexer-demultiplexer (MUX-DEMUX) units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Figure 2:
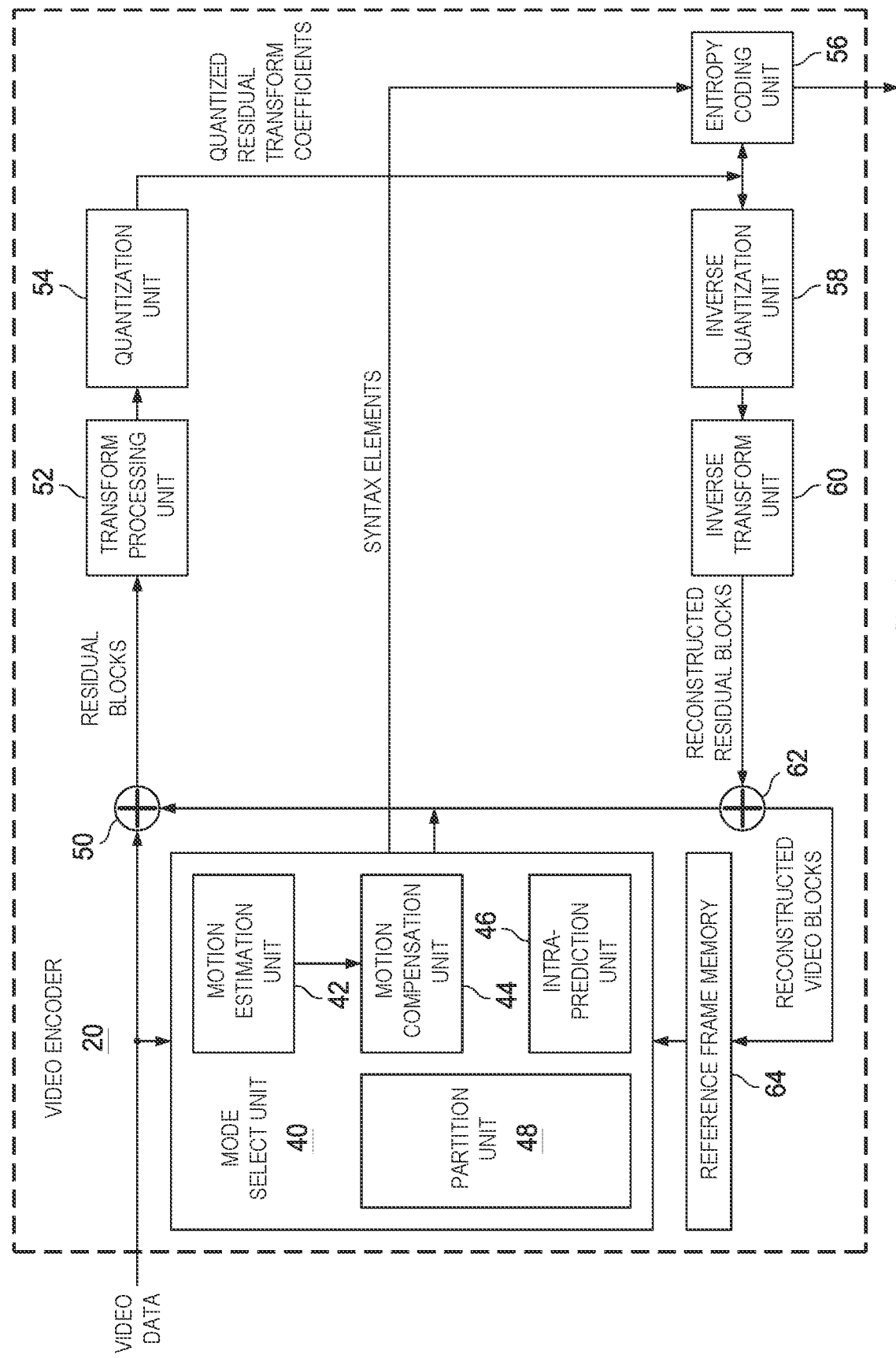
FIG. 2 is a block diagram illustrating an example video encoder that may implement bi-lateral prediction techniques.

FIG. 2 is a block diagram illustrating an example of video encoder 20 that may implement video coding techniques. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional (a.k.a., uni prediction) prediction (P mode) or bi-prediction (a.k.a., bi prediction) (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction (a.k.a., intra prediction) unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into largest coding units (LCUs), and partition each of the LCUs into sub-coding units (sub-CUs) based on rate-distortion analysis (e.g., rate-distortion optimization). Mode select unit 40 may further produce a quad-tree data structure indicative of partitioning of a LCU into sub-CUs. Leaf-node CUs of the quad-tree may include one or more prediction units (PUs) and one or more transform units (TUs).

The present disclosure uses the term "block" to refer to any of a CU, PU, or TU, in the context of HEVC, or similar data structures in the context of other standards (e.g., macroblocks and sub-blocks thereof in H.264/AVC). A CU includes a coding node, PUs, and TUs associated with the coding node. A size of the CU corresponds to a size of the coding node and is square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction (a.k.a., inter prediction) mode encoded. PUs may be partitioned to be non-square in shape. Syntax data associated with a CU may also describe, for example, partitioning of the CU into one or more TUs according to a quad-tree. A TU can be square or non-square (e.g., rectangular) in shape.

Mode select unit 40 may select one of the coding modes, intra- or inter-, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

In addition, intra-prediction unit 46 may be configured to code depth blocks of a depth map using a depth modeling mode (DMM). Mode select unit 40 may determine whether an available DMM mode produces better coding results than an intra-prediction mode and the other DMM modes, e.g., using rate-distortion optimization (RDO). Data for a texture image corresponding to a depth map may be stored in reference frame memory 64. Motion estimation unit 42 and motion compensation unit 44 may also be configured to inter-predict depth blocks of a depth map.

After selecting an intra-prediction mode for a block (e.g., a conventional intra-prediction mode or one of the DMM modes), intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

Transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
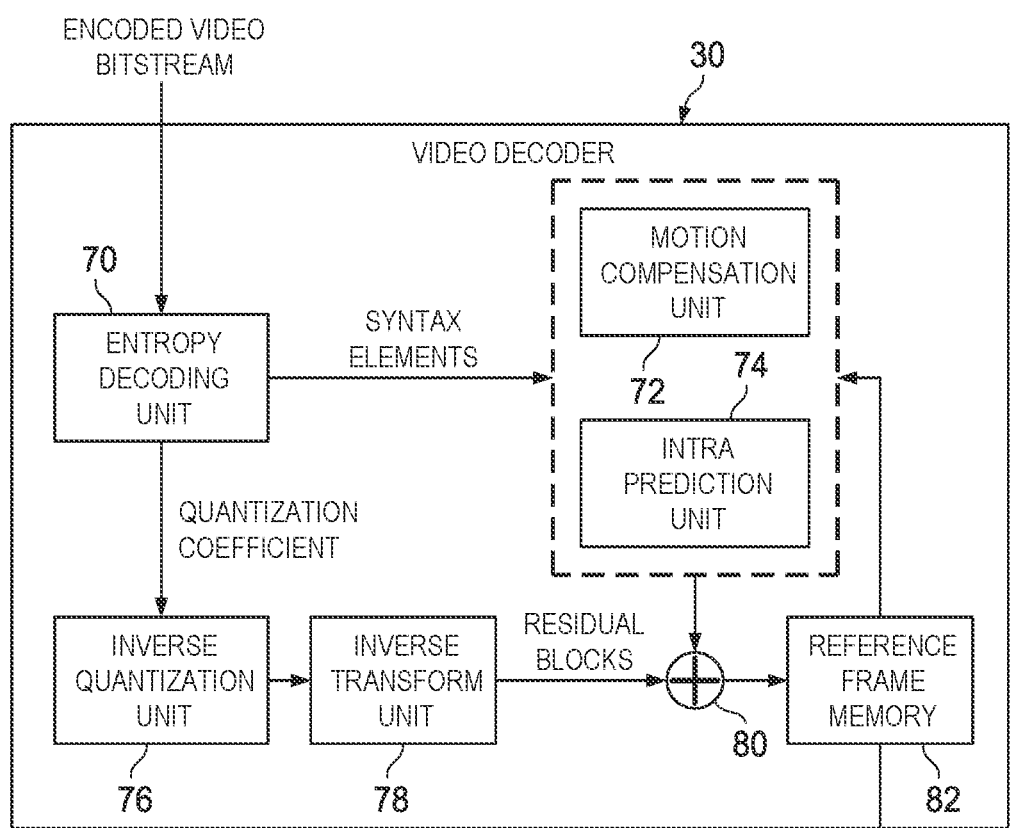
FIG. 3 is a block diagram illustrating an example of a video decoder that may implement bi-lateral prediction techniques.

FIG. 3 is a block diagram illustrating an example of video decoder 30 that may implement video coding techniques. In the example of FIG. 3, video decoder 30 includes an entropy decoding unit 70, motion compensation unit 72, intra-prediction unit 74, inverse quantization unit 76, inverse transformation unit 78, reference frame memory 82, and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of the video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra-prediction unit 74 may generate prediction data for a video block of the current video slice based on a signaled intra-prediction mode and data from previously decoded blocks of the current frame or picture. When the video frame is coded as an inter-coded (e.g., B, P, or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Data for a texture image corresponding to a depth map may be stored in reference frame memory 82. Motion compensation unit 72 may also be configured to inter-predict depth blocks of a depth map.

Image and video compression has experienced rapid growth, leading to various coding standards. Such video coding standards include ITU-T H.261, ISO/IEC MPEG-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes eXtensions such as Scalable Video Coding (SVC), Multiview Video Coding (MVC) and Multiview Video Coding plus Depth (MVC+D), and 3D AVC (3D-AVC). HEVC includes extensions such as Scalable HEVC (SHVC), Multiview HEVC (MV-HEVC), and 3D HEVC (3D-HEVC).

There is also a new video coding standard, named Versatile Video Coding (VVC), being developed by the joint video experts team (JVET) of ITU-T and ISO/IEC. The latest Working Draft (WD) of VVC is included in JVET-L1001-v5, which is publicly available at http://phenix.it-sudparis.eu/jvet/doc_end_user/documents/12_Macao/wg11/JVET-L1001-v11.zip.

Intra random access point (IRAP) pictures and leading pictures are discussed.

In HEVC, the following pictures are considered as intra random access point (IRAP) pictures: IDR, BLA, and CRA pictures. For VVC, during the 12th JVET meeting in October 2018, it was agreed to have both IDR and CRA pictures as IRAP pictures.

An IRAP picture provides the following two important functionalities/benefits. Firstly, the presence of an IRAP picture indicates that the decoding process can start from that picture. This functionality allows a random access feature in which the decoding process starts at a position in a bitstream, not necessarily the beginning of a bitstream, as long as an IRAP picture is present at that position. Secondly, the presence of an IRAP picture refreshes the decoding process such that the coded picture starting the IRAP picture, excluding Random Access Skipped Leading (RASL) pictures, are coded without any reference to previous pictures. Having an IRAP picture present in a bitstream consequently would stop any error that may happen during decoding of coded pictures prior to the IRAP picture to propagate to the IRAP picture and pictures that follow the IRAP picture in decoding order.

While IRAP pictures provide important functionalities, it comes with penalty to the compression efficiency. The presence of an IRAP picture would cause a surge in bit-rate. This penalty to the compression efficiency is due to two reasons: firstly, as an IRAP picture is an intra-predicted picture, the picture itself would require relatively more bits to represent when compared to other pictures that are inter-predicted pictures; secondly, since the presence of an IRAP picture would break temporal prediction (this is because the decoder would refresh the decoding process, in which one of the actions of the decoding process for this is to remove previous reference pictures in the DPB), it would cause the coding of pictures that follow the IRAP picture in decoding order less efficient (i.e., needs more bits to represent) because they have less reference pictures for their inter-prediction coding.

Among the picture types that are considered IRAP pictures, IDR picture in HEVC has different signaling and derivation when compared to other picture types. Some of the differences are as follows.

For signaling and derivation of POC value of an IDR picture, the most significant bit (MSB) part of the POC is not derived from the previous key picture but simply set to be equal to 0.

For signaling information needed for reference picture management, the slice header of an IDR picture does not contain information needed to be signaled to assist reference picture management. For other picture types (i.e., CRA, Trailing, Temporal Sublayer Access (TSA), etc.), information such as reference picture set (RPS) described in the section below or other forms of similar information (e.g., reference picture lists) is needed for the reference pictures marking process (i.e., the process to determine the status of reference pictures in the DPB, either used for reference and unused for reference). However, for an IDR picture, such information is not needed to be signaled because the presence of IDR indicates that the decoding process shall simply mark all reference pictures in the DPB as unused for reference.

In addition to IRAP pictures concept, there is also leading pictures that, if present, are associated with an IRAP picture. Leading pictures are pictures that follow its associated IRAP picture in decoding order but precede the IRAP picture in output order. Depending on the coding configuration and picture referencing structure, leading pictures are further identified into two types. The first type is the leading pictures that may not be decoded correctly if the decoding process starts at its associated IRAP picture. This may happen because these leading pictures are coded with reference to pictures that precede the IRAP picture in decoding order. Such leading pictures are called random access skipped leading (RASL). The second type is the leading pictures that shall be decoded correctly even if the decoding process starts at its associated IRAP picture. This is possible because these leading pictures are coded without referencing directly or indirectly to pictures that precede the IRAP picture in decoding order. Such leading pictures are called random access decodable leading (RADL). In HEVC, when RASL and RADL pictures are present, it is constrained that for RASL and RADL pictures that are associated with the same IRAP picture, the RASL pictures shall precede the RADL pictures in output order.

In HEVC and VVC, IRAP pictures and leading pictures are given different NAL unit types so that they can be easily identified by system level applications. For example, a video splicer needs to understand coded picture types without having to understand too much detail of syntax element in the coded bitstream, particularly to identify IRAP pictures from non-IRAP pictures and to identify leading pictures, including determining RASL and RADL pictures, from trailing pictures. Trailing pictures are those pictures that are associated with an IRAP picture and follow the IRAP picture in output order. A picture associated with a particular IRAP picture is a picture that follows the particular IRAP picture in decoding order and precedes any other IRAP picture in decoding order. For this, giving IRAP and leading pictures their own NAL unit type help such applications.

For HEVC, NAL unit types for IRAP pictures includes:
- BLA with leading picture (BLA_W_LP): NAL unit of a Broken Link Access (BLA) picture that may be followed by one or more leading pictures in decoding order.
- BLA with RADL (BLA_W_RADL): NAL unit of a BLA picture that may be followed by one or more RADL pictures but no RASL picture in decoding order.
- BLA with no leading picture (BLA_N_LP): NAL unit of a BLA picture that is not followed by leading picture in decoding order.
- IDR with RADL (IDR_W_RADL): NAL unit of an IDR picture that may be followed by one or more RADL pictures but no RASL picture in decoding order.
- IDR with no leading picture (IDR_N_LP): NAL unit of an IDR picture that is not followed by leading picture in decoding order.
- CRA: NAL unit of a Clean Random Access (CRA) picture that may be followed by leading pictures (i.e., either RASL pictures or RADL pictures or both).
- RADL: NAL unit of a RADL picture.
- RASL: NAL unit of a RASL picture.

For VVC, as per writing of this document, the NAL unit type for IRAP pictures and for leading pictures are still not clear/decided yet.

File format standards are discussed.

File format standards include the ISO base media file format (ISOBMFF, ISO/IEC 14496-12, hereinafter, "ISO/IEC 14996-12") and other file format standards derived from ISOBMFF, including MPEG-4 file format (ISO/IEC 14496-14), 3GPP file format (3GPP TS 26.244), and AVC file format (ISO/IEC 14496-15, hereinafter "ISO/IEC 14996-15"). Thus, ISO/IEC 14496-12 specifies the ISO base media file format. Other documents extend the ISO base media file format for specific applications. For instance, ISO/IEC 14496-15 describes the carriage of NAL unit structured video in the ISO base media file format. H.264/AVC and HEVC, as well as their extensions, are examples of NAL unit structured video. ISO/IEC 14496-15 includes sections describing the carriage of H.264/AVC NAL units. Additionally, section 8 of ISO/IEC 14496-15 describes the carriage of HEVC NAL units. Thus, section 8 of ISO/IEC 14496-15 is said to describe the HEVC file format.

ISOBMFF is used as the basis for many codec encapsulation formats, such as the AVC File Format, as well as for many multimedia container formats, such as the MPEG-4 File Format, the 3GPP File Format (3GP), and the DVB File Format. In addition to continuous media, such as audio and video, static media, such as images, as well as metadata, can be stored in a file conforming to ISOBMFF. Files structured according to ISOBMFF may be used for many purposes, including local media file playback, progressive downloading of a remote file, segments for Dynamic Adaptive Streaming over HTTP (DASH), containers for content to be streamed and its packetization instructions, and recording of received real-time media streams. Thus, although originally designed for storage, ISOBMFF has proven valuable for streaming, e.g., for progressive download or DASH. For streaming purposes, movie fragments defined in ISOBMFF can be used. In addition to continuous media, such as audio and video, static media, such as images, as well as metadata can be stored in a file conforming to ISOBMFF.

A file conforming to the HEVC file format may comprise a series of objects, called boxes. A box may be an object-oriented building block defined by a unique type identifier and length. A box is the elementary syntax structure in ISOBMFF and may include a four-character coded box type, a byte count of the box, and a payload. In other words, a box may be a syntax structure comprising a coded box type, a byte count of the box, and a payload. In some instances, all data in a file conforming to the HEVC file format may be contained within boxes and there may be no data in the file that is not in a box. Thus, an ISOBMFF file may consist of a sequence of boxes, and boxes may contain other boxes. For instance, the payload of a box may include one or more additional boxes.

A file conforming to ISOBMFF may include various types of boxes. For example, a file conforming to ISOBMFF may include a file type box, a media data box, a movie box, a movie fragment box, and so on. In this example, a file type box includes file type and compatibility information. A media data box may contain samples (e.g., coded pictures). A Movie box ("moov") contains metadata for continuous media streams present in the file. Each of the continuous media streams may be represented in the file as a track. For instance, a movie box may contain metadata regarding a movie (e.g., logical and timing relationships between samples, and also pointers to locations of samples). Movie boxes may include several types of sub-boxes. The sub-boxes in a movie box may include one or more track boxes. A track box may include information about an individual track of a movie. A track box may include a track header box that specifies overall information of a single track. In addition, a track box may include a media box that contains a media information box. The media information box may include a sample table box that contains data indexing media samples in the track. Information in the sample table box may be used to locate samples in time and, for each of the samples of the track, a type, size, container, and offset into that container of the sample. Thus, the metadata for a track is enclosed in a Track box ("trak"), while the media content of a track is either enclosed in a Media Data box ("mdat") or directly in a separate file. The media content for tracks comprises or consists of a sequence of samples, such as audio or video access units.

ISOBMFF specifies the following types of tracks: a media track, which contains an elementary media stream, a hint track, which either includes media transmission instructions or represents a received packet stream, and a timed metadata track, which comprises time-synchronized metadata. The metadata for each track includes a list of sample description entries, each providing the coding or encapsulation format used in the track and the initialization data used for processing that format. Each sample is associated with one of the sample description entries of the track.

ISOBMFF enables specifying sample-specific metadata with various mechanisms. Specific boxes within the Sample Table box ("stbl") have been standardized to respond to common needs. The Sample Table box contains a sample table that contains all the time and data indexing of the media samples in a track. Using the tables in the Sample Table box, it may be possible to locate samples in time, determine their type (e.g., I-frame or not), and determine their size, container, and offset into that container.

A Movie Fragment box is a top-level box. Each Movie Fragment box provides information that would have previously been in the Movie box. A Movie Fragment box may contain one or more track fragment ("traf") boxes. Within the Movie Fragment there is a set of track fragments, zero or more per track. The track fragments in turn contain zero or more track runs, each of which documents a contiguous run of samples for that track. For instance, each track run may contain samples of pictures that are contiguous in a certain order, such as decoding order. A track fragment box is defined in the 14996-12 specification and comprises metadata for one or more track fragments. For instance, a track fragment box may include a track fragment header box indicating a track identifier (ID), a base data offset, a sample description index, a default sample duration, a default sample size, and default sample flags. A track fragment box may include one or more track fragment run boxes, each documenting a contiguous set of samples for a track. For instance, a track fragment box may include syntax elements indicating a sample count, a data offset, sample flags, a sample duration, a sample size, sample composition time offset, and so on. Within these structures, many fields are optional and can be defaulted.

Stream access point (SAP) is discussed.

The ISO media file format (ISOBMFF) defines a concept so called stream access point (SAP). A SAP enables random access into a container of media stream(s). A container may contain more than one media stream, each being an encoded version of continuous media of certain media type. A SAP is a position in a container enabling playback of an identified media stream to be started using only (a) the information contained in the container starting from that position onwards, and (b) possible initialization data from other part(s) of the container, or externally available. Derived specifications should specify if initialization data is needed to access the container at a SAP, and how the initialization data can be accessed.

There are six types of SAP that are defined, and they are:

Type 1 corresponds to what is known in some coding schemes as a "Closed GoP random access point" (in which all access units, in decoding order, starting from improved sample-based angular intra prediction (ISAP) can be correctly decoded, resulting in a continuous time sequence of correctly decoded access units with no gaps) and in addition the access unit in decoding order is also the first access unit in composition order.

Type 2 corresponds to what is known in some coding schemes as a "Closed GoP random access point", for which the first access unit in decoding order in the media stream is not the first access unit in composition order.

Type 3 corresponds to what is known in some coding schemes as an "Open GoP random access point", in which there are some access units in decoding order following the random access point that cannot be correctly decoded and the random access point access unit may not be the first access unit in composition order.

Type 4 corresponds to what is known in some coding schemes as a "Gradual Decoding Refresh (GDR) starting point".

Type 5 corresponds to the case for which there is at least one access unit in decoding order starting from the first access unit for decoding that cannot be correctly decoded and has presentation time greater than TDEC and where TDEC is the earliest presentation time of any access unit starting from the first access unit for decoding.

Type 6 corresponds to the case for which there is at least one access unit in decoding order starting from the first access unit for decoding that cannot be correctly decoded and has presentation time greater than TDEC and where TDEC is not the earliest presentation time of any access unit starting from the first access unit for decoding.

For HEVC, the design of NAL unit types for IRAP pictures was made with one of the objectives being easy mapping between IRAP types and SAP types, particularly SAP type 1 to type 3.

Dynamic adaptive streaming over HTTP (DASH) is discussed.

Dynamic adaptive streaming over HTTP (DASH), specified in ISO/IEC 23009-1, is a standard for HTTP (adaptive) streaming applications. DASH mainly specifies the format of the media presentation description (MPD), also known as manifest, and the media segment format. The MPD describes the media available on the server and lets the DASH client autonomously download the media version at the media time it is interested in.

DASH is based on a hierarchical data model. A presentation is described by an MPD document that describes the sequence of periods in time that make up the media presentation. A period typically represents a media content period during which a consistent set of encoded versions of the media content is available, e.g., the set of available bitrates, languages, captions, subtitles, etc. does not change during a period.

Within a period, material is arranged into adaptation sets. An adaptation set represents a set of interchangeable encoded versions of one or several media content components. For example, there may be one adaptation set for the main video component and a separate adaptation set for the main audio component. Other available material, such as captions or audio descriptions, may each have a separate adaptation set. Material may also be provided in multiplexed form, in which case interchangeable versions of the multiplex may be described as a single adaptation set, for example an adaptation set containing both the main audio and main video for a period. Each of the multiplexed components may be described individually by a media content component description.

An adaptation set contains a set of representations. A representation describes a deliverable encoded version of one or several media content components. A representation includes one or more media streams (one for each media content component in the multiplex). Any single representation within an adaptation set is sufficient to render the contained media content components. By collecting different representations in one adaptation set, the media presentation author expresses that the representations represent perceptually equivalent content. Typically, this means, that clients may switch dynamically from representation to representation within an adaptation set in order to adapt to network conditions or other factors. Switching refers to the presentation of decoded data up to a certain time t, and presentation of decoded data of another representation from time t onwards. If representations are included in one Adaptation Set, and the client switches properly, the media presentation is expected to be perceived seamless across the switch. Clients may ignore representations that rely on codecs or other rendering technologies they do not support or that are otherwise unsuitable. Within a representation, the content may be divided in time into segments for proper accessibility and delivery. In order to access a segment, a URL is provided for each segment. Consequently, a segment is the largest unit of data that can be retrieved with a single HTTP request.

A typical procedure for DASH based HTTP streaming includes the following steps.

1) A client obtains the MPD of a streaming content, e.g., a movie. The MPD includes information on different alternative representations, e.g., bit rate, video resolution, frame rate, audio language of the streaming content, as well as the URLs of the HTTP resources (the initialization segment and the media segments).

2) Based on information in the MPD and the client's local information, e.g., network bandwidth, decoding/display capabilities, and user preference, the client requests the desired representation(s), one segment (or a part thereof) at a time.

3) When the client detects a network bandwidth change, it requests segments of a different representation with a better-matching bitrate, ideally starting from a segment that starts with a random access point.

During an HTTP streaming "session," to respond to the user request to seek backward to a past position or forward to a future position, the client requests past or future segments starting from a segment that is close to the desired position and that ideally starts with a random access point. The user may also request to fast-forward the content, which may be realized by requesting data sufficiently for decoding only the intra-coded video pictures or only a temporal subset of the video stream.

Problems of the existing IRAP and leading pictures are discussed.

The current design of NAL unit types for leading pictures and IRAP pictures have the following problems:

There are two NAL unit types given for identification of leading pictures (i.e., RASL and RADL) at the NAL unit header level for the reason to help system level applications to identify RASL and to remove it from the bitstream by simply parsing the NAL unit header when decoding starts from their associated IRAP picture. However, in practice, such removal by system applications is seldom performed, as the leading pictures and their associated IRAP picture are encapsulated in the same DASH Media Segment, and in HTTP based adaptive streaming, such DASH Media Segment is requested by the client, thus the leading pictures and their associated IRAP picture are not separately requested such that requesting of the RASL pictures can be avoided. Furthermore, allowing system applications the possibility to remove or not to remove RASL pictures consequently requires video coding specification to handle both possibilities, i.e., of with and without RASL pictures, and need specifying of bitstream conformance for both situations, including the specification of hypothetical decoder reference (HRD) that includes two alternative sets of HRD parameters.

For IRAP pictures, several NAL unit types are given to differentiate them based on the presence of leading pictures with objective to make it easy to map them to SAP type 1 to 3. However, due to flexibility in the definition of the IRAP NAL unit types, particularly the CRA type, in many cases, mapping between IRAP picture types to SAP types cannot be done simply by only knowing its NAL unit type. Access units that follow the IRAP pictures still need to be checked. For example, as the CRA may be followed by zero or more RASL or zero or more RADL or none of them, it can be mapped as SAP type 1, type 2, or type 3. The only way to know how to map a CRA picture to SAP type is to parse the following access units to see if there is/are leading pictures or not and if there are leading pictures, then of what type.

Disclosed herein are video coding techniques that restrict a set of NAL unit types available for video data to five or less specific NAL unit types (e.g., restrict the number of NAL unit types to four). Each NAL unit has a header and is identified by an identifier (ID). Fewer NAL types means the ID can be smaller. Hence, the size of each NAL unit can be decreased, which significantly reduces the size of the bitstream (saving memory). This also reduces this size of each packet used to transmit the bitstream, which reduces network resource usage. Moreover, five or less specific NAL unit types allows leading and trailing pictures (a.k.a., non-IRAP pictures) to share the same NAL unit type. This also allows NAL unit types to indicate whether or not an I-RAP picture is associated with a RADL picture and/or a RASL picture. In addition, the specific NAL unit types can be mapped to different SAP types in DASH. Disclosed herein are also video coding techniques for when non-IRAP pictures are not identified by the NAL unit type. In such cases, flags in a bitstream are set to a particular value to indicate whether or not an IRAP picture is associated with a RADL picture or a RASL picture.

Figure 4:
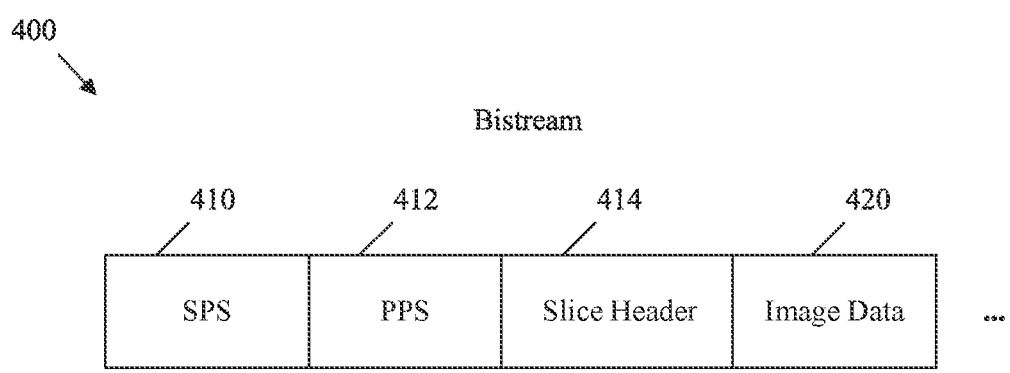
FIG. 4 is a schematic diagram of an embodiment of a video bitstream.

FIG. 4 is a schematic diagram of an embodiment of a video bitstream 400. As used herein the video bitstream 400 may also be referred to as a coded video bitstream, a bitstream, or variations thereof. As shown in FIG. 4, the bitstream 400 comprises a sequence parameter set (SPS) 410, a picture parameter set (PPS) 412, a slice header 414, and image data 420. In a practical application, the slice header 414 may be referred to as a tile group header.

The SPS 410 contains data that is common to all the pictures in a sequence of pictures (SOP). In contrast, the PPS 412 contains data that is common to the entire picture. The slice header 414 contains information about the current slice such as, for example, the slice type, which of the reference pictures will be used, and so on. The SPS 410 and the PPS 412 may be generically referred to as a parameter set. The SPS 410, the PPS 412, and the slice header 414 are types of Network Abstraction Layer (NAL) units. The image data 420 comprises data associated with the images or video being encoded or decoded. The image data 420 may be simply referred to as the payload or data being carried in the bitstream 400.

In an embodiment, the SPS 410, the PPS 412, the slice header 414, or another portion of the bitstream 400 carries a plurality of reference picture list structures, each of which contains a plurality of reference picture entries. Those skilled in the art will appreciate that the bitstream 400 may contain other parameters and information in practical applications.

Figure 5:
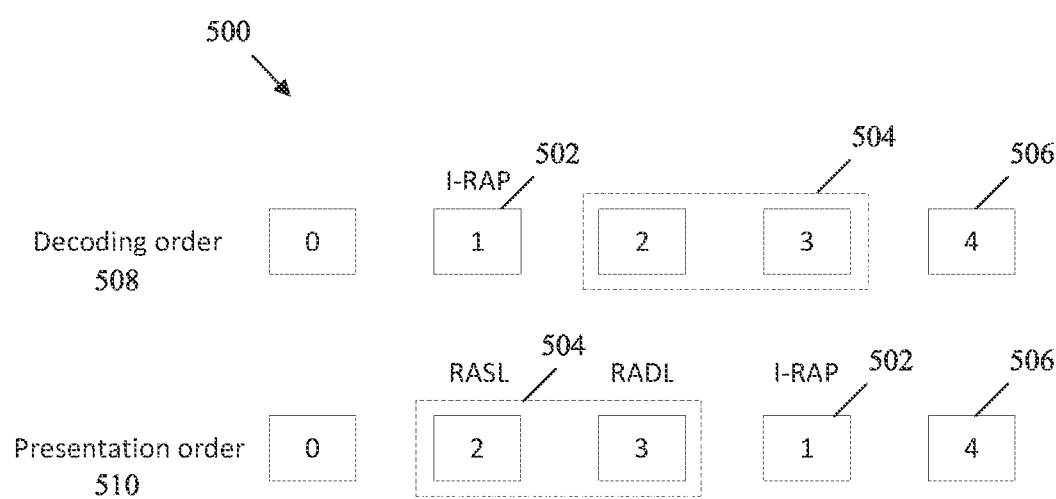
FIG. 5 is a representation of relationship between an I-RAP picture relative to leading pictures and trailing pictures in a decoding order and a presentation order.

FIG. 5 is a representation 500 of relationship between an I-RAP picture 502 relative to leading pictures 504 and trailing pictures 506 in a decoding order 508 and a presentation order 510. In an embodiment, the I-RAP picture 502 is referred to as a clean random access (CRA) picture or as an instantaneous decoder refresh (IDR) picture with RADL picture.

As shown in FIG. 5, the leading pictures 504 (e.g., pictures 2 and 3) follow the I-RAP picture 502 in the decoding order 508, but precede the I-RAP picture 502 in the presentation order 510. The trailing picture 506 follows the I-RAP picture 502 in both the decoding order 508 and in the presentation order 510. While two leading pictures 504 and one trailing picture 506 are depicted in FIG. 5, those skilled in the art will appreciate that more or fewer leading pictures 504 and/or trailing pictures 506 may be present in the decoding order 508 and the presentation order 510 in practical applications.

The leading pictures 504 in FIG. 5 have been divided into two types, namely RASL and RADL. When decoding starts with the I-RAP picture 502 (e.g., picture 1), the RADL picture (e.g., picture 3) can be properly decoded; however, the RASL picture (e.g., picture 2) cannot be property decoded. Thus, the RASL picture is discarded. In light of the distinction between RADL and RASL pictures, the type of leading picture associated with the I-RAP picture should be identified as either RADL or RASL for efficient and proper coding.

Figure 6:
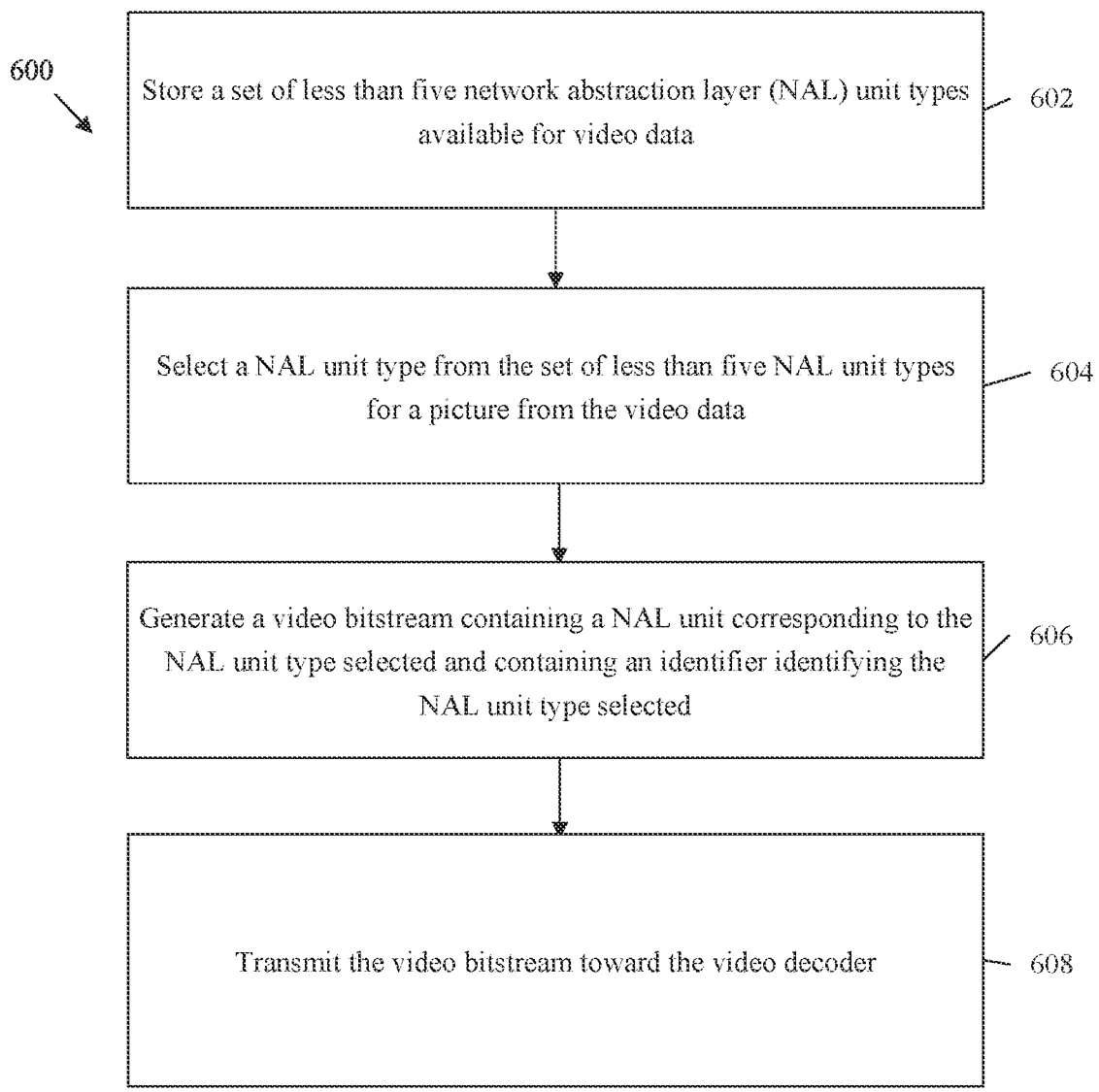
FIG. 6 is an embodiment of a method of encoding a video bitstream.

FIG. 6 is an embodiment of a method 600 of encoding a video bitstream (e.g., bitstream 400) implemented by a video encoder (e.g., video encoder 20). The method 600 may be performed when a picture (e.g., from a video) is to be encoded into a video bitstream and then transmitted toward a video decoder (e.g., video decoder 30). The method 600 improves the encoding process (e.g., makes the encoding process more efficient, faster, etc., than conventional encoding processes) because a limited set of NAL unit types which, for example, identify the type of leading picture associated with an I-RAP picture, are utilized. Therefore, as a practical matter, the performance of a codec is improved, which leads to a better user experience.

In block 602, a set of less than five NAL unit types available for video data is stored in a memory of a video encoder. In an embodiment, the set of less than five NAL unit types includes a leading and trailing pictures NAL unit type; an intra random access point (IRAP) with random access skipped leading (RASL) NAL unit type, an IRAP with random access decodable leading (RADL) NAL unit type, and an IRAP with no leading pictures NAL unit type. In an embodiment, the set of less than five NAL unit types is restricted to only these four NAL unit types. In an embodiment, both leading and trailing pictures (e.g., leading pictures 504 and trailing picture 506) are assigned the leading and trailing pictures NAL unit type.

In block 604, a NAL unit type is selected from the set of less than five NAL unit types for a picture (e.g., picture 2 or picture 3 in FIG. 5) from the video data. For example, the NAL unit type for picture 2 in FIG. 5 may be an IRAP with RSAL NAL unit type. As another example, the NAL unit type for picture 3 in FIG. 5 may be an IRAP with RADL NAL unit type.

In an embodiment, the IRAP with RASL NAL unit type is selected for an IRAP picture that is followed by one or more RASL pictures and zero or more RADL pictures in decoding order. In an embodiment, the IRAP picture is referred to as a CRA picture. In an embodiment, the IRAP with RASL NAL unit type is referred to as a clean random access (CRA) NAL unit type. In an embodiment, the IRAP with RASL NAL unit type is designated IRAP_W_RASL. In an embodiment, the IRAP_W_RASL designation corresponds to stream access point (SAP) type 3 in dynamic adaptive streaming over hypertext transfer protocol (DASH).

In an embodiment, the IRAP with RADL NAL unit type is selected for an IRAP picture that is followed by one or more RADL pictures and zero RADL pictures in decoding order. In an embodiment, the IRAP picture is referred to as an instantaneous decoder refresh (IDR) picture with RADL picture. In an embodiment, the IRAP with RADL NAL unit type is referred to as an instantaneous decoder refresh (IDR) with RADL NAL unit type. In an embodiment, the IRAP with RADL NAL unit type is designated IRAP_W_RADL. In an embodiment, the IRAP_W_RADL corresponds to stream access point (SAP) type 2 in dynamic adaptive streaming over hypertext transfer protocol (DASH).

In an embodiment, the IRAP with no leading pictures NAL unit type is selected for an IRAP picture that is not followed by a leading picture in decoding order. In an embodiment, the IRAP picture is referred to as an instantaneous decoder refresh (IDR) picture without a leading picture. In an embodiment, the IRAP with no leading pictures NAL unit type is referred to as an instantaneous decoder refresh (IDR) without leading pictures NAL unit type. In an embodiment, the IRAP with no leading pictures NAL unit type is designated IRAP_N_LP. In an embodiment, the IRAP_N_LP designation corresponds to stream access point (SAP) type 1 in dynamic adaptive streaming over hypertext transfer protocol (DASH).

In block 606, a video bitstream (e.g., bitstream 400 in FIG. 4) is generated. The video bitstream contains a NAL unit corresponding to the NAL unit type selected as well as an identifier identifying the NAL unit type selected. The identifier may be, for example, a flag or a number of bits.

In block 608, the video encoder transmits the video bitstream (e.g., bitstream 400) toward a video decoder. The video bitstream may also be referred to as a coded video bitstream or an encoded video bitstream. Once received by the video decoder, the encoded video bitstream may be decoded (e.g., as described below) to generate or produce an image for display to a user on the display or screen of an electronic device (e.g., a smart phone, tablet, laptop, personal computer, etc.).

Figure 7:
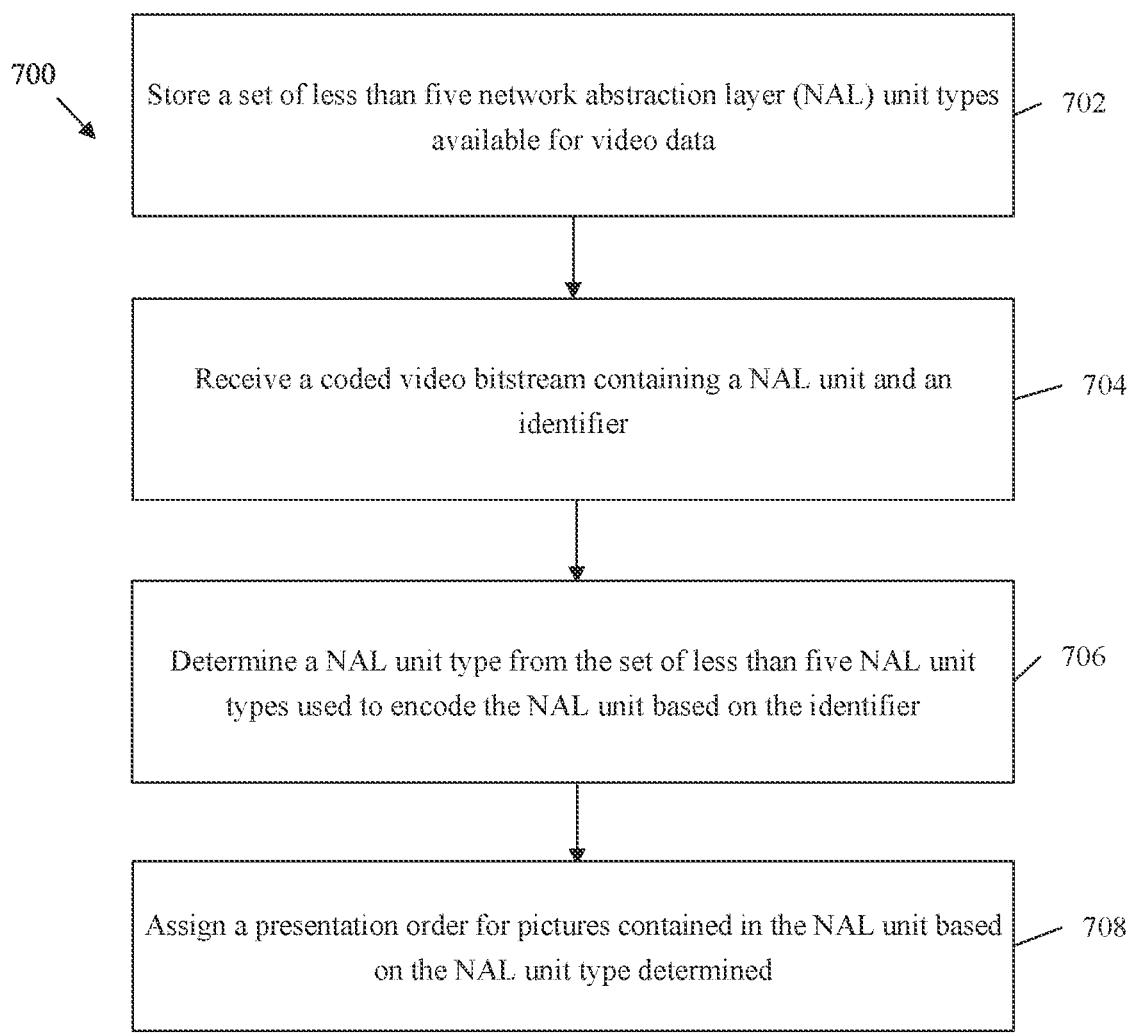
FIG. 7 is an embodiment of a method of decoding a coded video bitstream.

FIG. 7 is an embodiment of a method 700 of decoding a coded video bitstream (e.g., bitstream 400) implemented by a video decoder (e.g., video decoder 30). The method 700 may be performed after the decoded bitstream has been directly or indirectly received from a video encoder (e.g., video encoder 20). The method 700 improves the decoding process (e.g., makes the decoding process more efficient, faster, etc., than conventional decoding processes) because a limited set of NAL unit types which, for example, identify the type of leading picture associated with an I-RAP picture, are utilized. Therefore, as a practical matter, the performance of a codec is improved, which leads to a better user experience.

In block 702, a set of less than five network abstraction layer (NAL) unit types available for video data is stored. In an embodiment, the set of less than five NAL unit types includes a leading and trailing pictures NAL unit type; an intra random access point (IRAP) with random access skipped leading (RASL) NAL unit type, an IRAP with random access decodable leading (RADL) NAL unit type, and an IRAP with no leading pictures NAL unit type. In an embodiment, the set of less than five NAL unit types is restricted to only these four NAL unit types. In an embodiment, both leading and trailing pictures (e.g., leading pictures 504 and trailing picture 506) are assigned the leading and trailing pictures NAL unit type.

In block 704, a coded video bitstream (e.g., bitstream 400) containing a NAL unit and an identifier is received. In block 706, a NAL unit type from the set of less than five NAL unit types used to encode the NAL unit is determined based on the identifier.

For example, the NAL unit type for picture 2 in FIG. 5 may be an IRAP with RSAL NAL unit type. As another example, the NAL unit type for picture 3 in FIG. 5 may be an IRAP with RADL NAL unit type.

In an embodiment, the IRAP with RASL NAL unit type is selected for an IRAP picture that is followed by one or more RASL pictures and zero or more RADL pictures in decoding order. In an embodiment, the IRAP picture is referred to as a CRA picture. In an embodiment, the IRAP with RASL NAL unit type is referred to as a clean random access (CRA) NAL unit type. In an embodiment, the IRAP with RASL NAL unit type is designated IRAP_W_RASL. In an embodiment, the IRAP_W_RASL designation corresponds to stream access point (SAP) type 3 in dynamic adaptive streaming over hypertext transfer protocol (DASH).

In an embodiment, the IRAP with RADL NAL unit type is selected for an IRAP picture that is followed by one or more RADL pictures and zero RADL pictures in decoding order. In an embodiment, the IRAP picture is referred to as an instantaneous decoder refresh (IDR) picture with RADL picture. In an embodiment, the IRAP with RADL NAL unit type is referred to as an instantaneous decoder refresh (IDR) with RADL NAL unit type. In an embodiment, the IRAP with RADL NAL unit type is designated IRAP_W_RADL. In an embodiment, the IRAP_W_RADL corresponds to stream access point (SAP) type 2 in dynamic adaptive streaming over hypertext transfer protocol (DASH).

In an embodiment, the IRAP with no leading pictures NAL unit type is selected for an IRAP picture that is not followed by a leading picture in decoding order. In an embodiment, the IRAP picture is referred to as an instantaneous decoder refresh (IDR) picture without a leading picture. In an embodiment, the IRAP with no leading pictures NAL unit type is referred to as an instantaneous decoder refresh (IDR) without leading pictures NAL unit type. In an embodiment, the IRAP with no leading pictures NAL unit type is designated IRAP_N_LP. In an embodiment, the IRAP_N_LP designation corresponds to stream access point (SAP) type 1 in dynamic adaptive streaming over hypertext transfer protocol (DASH).

In block 708, a presentation order (e.g., presentation order 510 in FIG. 5) for pictures contained in the NAL unit is assigned based on the NAL unit type determined. The presentation order may be used to generate or produce an image for display to a user on the display or screen of an electronic device (e.g., a smart phone, tablet, laptop, personal computer, etc.).

Figure 8:
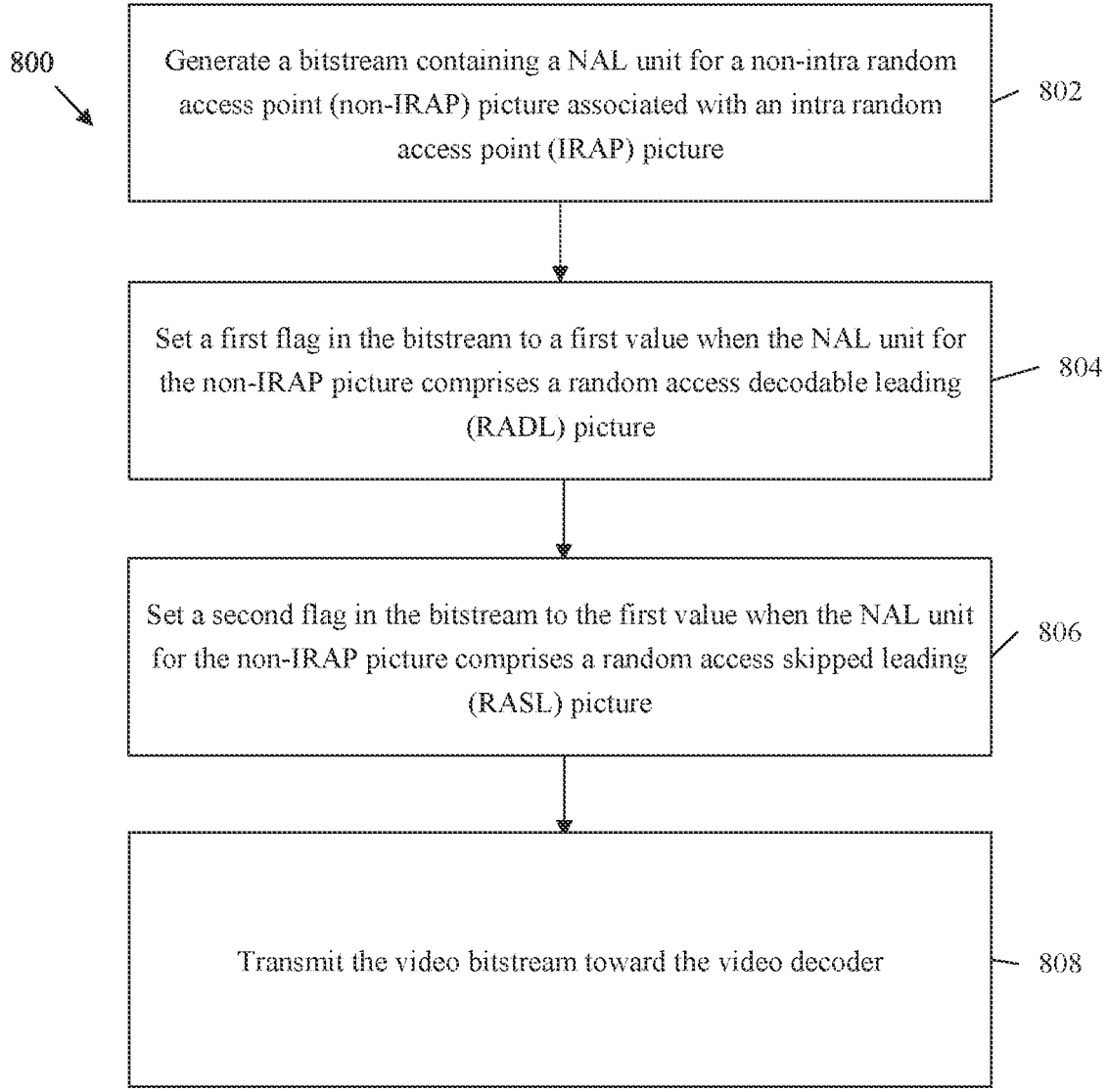
FIG. 8 is an embodiment of a method of encoding a video bitstream.

FIG. 8 is an embodiment of a method 800 of encoding a video bitstream (e.g., bitstream 400) implemented by a video encoder (e.g., video encoder 20). The method 800 may be performed when a picture (e.g., from a video) is to be encoded into a video bitstream and then transmitted toward a video decoder (e.g., video decoder 30). The method 800 improves the encoding process (e.g., makes the encoding process more efficient, faster, etc., than conventional encoding processes) because a flag is set to indicate, for example, that the NAL unit for a non-IRAP picture is either a RADL or a RASL. Therefore, as a practical matter, the performance of a codec is improved, which leads to a better user experience.

In block 802, a bitstream containing a NAL unit for a non-intra random access point (non-IRAP) picture associated with an intra random access point (IRAP) picture is generated. The non-IRAP picture may be a leading picture (e.g., leading picture 504) or a trailing picture (trailing picture 506).

In block 804, a first flag in the bitstream is set to a first value to indicate that the NAL unit for the non-IRAP picture comprises a random access decodable leading (RADL) picture. In an embodiment, the first flag is designated a RadlPictureFlag and the second flag is designated a RaslPictureFlag. In an embodiment, the first value is one (1). In an embodiment, the first flag is set equal to the first value when a picture order count (POC) value of the non-IRAP picture is less than a POC value of the IRAP picture. In an embodiment, the first flag is set equal to the first value when each reference picture list for the non-IRAP picture does not contain any picture other than the IRAP picture associated with the non-IRAP picture or another RADL picture associated with the IRAP picture.

In block 806, a second flag in the bitstream is set to the first value to indicate that the NAL unit for the non-IRAP picture comprises a random access skipped leading (RASL) picture. In an embodiment, the second flag is set equal to the first value when a picture order count (POC) value of the non-IRAP picture is less than a POC value of the IRAP picture. In an embodiment, the second flag is set equal to the first value when either reference picture list for the non-IRAP picture contains at least one reference picture that precedes the IRAP picture associated with the non-IRAP picture in decoding order or another RASL picture associated with the IRAP picture.

In an embodiment, the first flag and the second flag may be set to a second value to indicate that the NAL unit for the non-IRAP picture does not include the RADL picture or the RASL picture. In an embodiment, the second value is zero (0). In an embodiment, the first flag and the second flag are not both set to the first value for the non-IRAP picture.

In block 808, the video encoder transmits the video bitstream (e.g., bitstream 400) toward a video decoder. The video bitstream may also be referred to as a coded video bitstream or an encoded video bitstream. Once received by the video decoder, the encoded video bitstream may be decoded (e.g., as described below) to generate or produce an image for display to a user on the display or screen of an electronic device (e.g., a smart phone, tablet, laptop, personal computer, etc.).

Figure 9:
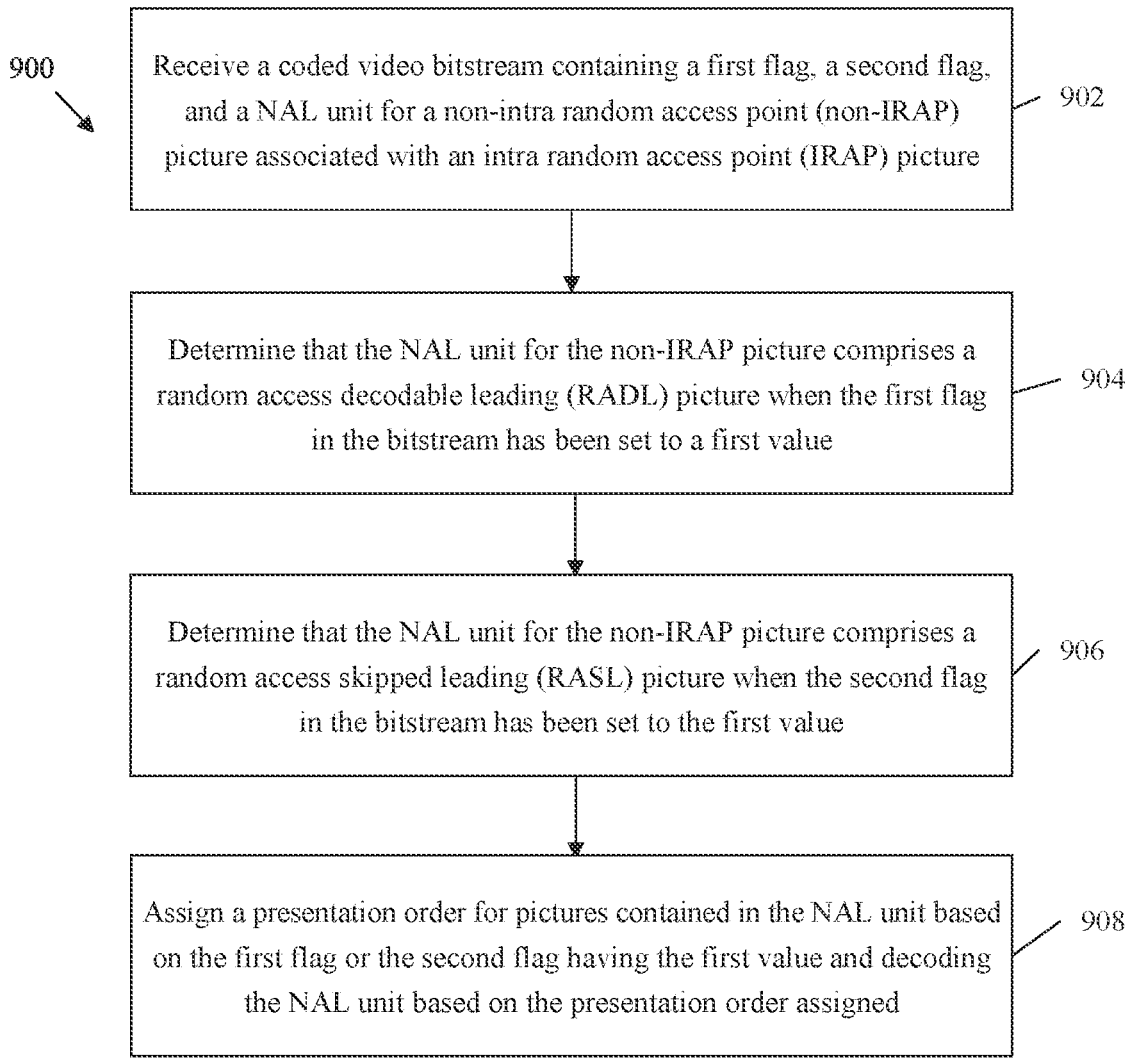
FIG. 9 is an embodiment of a method of decoding a coded video bitstream.

FIG. 9 is an embodiment of a method 900 of decoding a coded video bitstream (e.g., bitstream 400) implemented by a video decoder (e.g., video decoder 30). The method 900 may be performed after the decoded bitstream has been directly or indirectly received from a video encoder (e.g., video encoder 20). The method 900 improves the decoding process (e.g., makes the decoding process more efficient, faster, etc., than conventional decoding processes) because a flag is set to indicate, for example, that the NAL unit for a non-IRAP picture is either a RADL or a RASL. Therefore, as a practical matter, the performance of a codec is improved, which leads to a better user experience.

In block 902, a coded video bitstream containing a first flag, a second flag, and a NAL unit for a non-intra random access point (non-IRAP) picture associated with an intra random access point (IRAP) picture is received. The non-IRAP picture may be a leading picture (e.g., leading picture 504) or a trailing picture (trailing picture 506).

In block 904, a determination that the NAL unit for the non-IRAP picture comprises a random access decodable leading (RADL) picture is made when the first flag in the bitstream has been set to a first value. In an embodiment, the first flag is designated a RadlPictureFlag and the second flag is designated a RaslPictureFlag. In an embodiment, the first value is one (1). In an embodiment, the first flag is set equal to the first value when a picture order count (POC) value of the non-IRAP picture is less than a POC value of the IRAP picture. In an embodiment, the first flag is set equal to the first value when each reference picture list for the non-IRAP picture does not contain any picture other than the IRAP picture associated with the non-IRAP picture or another RADL picture associated with the IRAP picture.

In block 906, a determination that the NAL unit for the non-IRAP picture comprises a random access skipped leading (RASL) picture is made when the second flag in the bitstream has been set to the first value. In an embodiment, the second flag is set equal to the first value when a picture order count (POC) value of the non-IRAP picture is less than a POC value of the IRAP picture. In an embodiment, the second flag is set equal to the first value when either reference picture list for the non-IRAP picture contains at least one reference picture that precedes the IRAP picture associated with the non-IRAP picture in decoding order or another RASL picture associated with the IRAP picture.

In an embodiment, the first flag and the second flag may be set to a second value to indicate that the NAL unit for the non-IRAP picture does not include the RADL picture or the RASL picture. In an embodiment, the second value is zero (0). In an embodiment, the first flag and the second flag are not both set to the first value for the non-IRAP picture.

In block 908, a presentation order (e.g., presentation order 510 in FIG. 5) for pictures contained in the NAL unit is assigned based on the first flag or the second flag having the first value. The presentation order may be used to generate or produce an image for display to a user on the display or screen of an electronic device (e.g., a smart phone, tablet, laptop, personal computer, etc.).

In one alternative to the above, the NAL unit types for leading pictures and IRAP pictures are assigned as follows: two NAL unit types for leading pictures, namely RASL_NUT and RADL_NUT, and one NAL unit type for IRAP pictures, namely IRAP_NUT.

In an embodiment, the mapping from IRAP NAL unit types to SAP types is as follows. When a picture with IRAP NAL unit type is encountered, the application should count the number of pictures with the RASL NAL unit type and the number of pictures with RADL NAL unit type between the IRAP picture and the first trailing picture (e.g., the picture with trailing NAL unit type) that follows the IRAP picture in decoding order. Depending on the number of RASL and RADL picture counts, the following mapping is specified.

If the number of RASL picture is greater than 0, the IRAP picture is SAP type 3. Else, if the number of RASL picture is 0 and the number of RADL is greater than 0, the IRAP picture is SAP type 2. Else, (e.g., the number of both RASL picture and RADL picture is 0), the IRAP picture is SAP type 1.

In another alternative, the NAL unit types for leading pictures and IRAP pictures are assigned as follows: two NAL unit types for leading pictures, namely RASL_NUT and RADL_NUT. The definition of NAL unit types for IRAP pictures is as follows. IDR (IDR_NUT): NAL unit of an IRAP picture that is zero or more RADL picture and zero RASL picture in decoding order. CRA (CRA_NUT): NAL unit of an IRAP picture that is followed by one or more RASL pictures and zero or more RADL pictures in decoding order.

The mapping from IRAP NAL unit types to SAP types is as follows: CRA_NUT is SAP type 3.

When a picture with IDR_NUT type is encountered, the application should check the picture that follows the IDR picture in decoding order. If the following picture is a picture with RADL_NUT, then the IDR picture is SAP 2. Else, the IDR picture is SAP 1.

It is constrained that when a picture is IDR_NUT type, the picture that immediately follows IDR picture in decoding order shall be either picture with RADL_NUT or Trailing NUT.

In yet another alternative, the NAL unit types for leading pictures and IRAP pictures are assigned as follows: one NAL unit type for leading pictures: LP_NUT. The definition of NAL unit types for IRAP pictures is as follows: IDR (IDR_NUT): NAL unit of an IRAP picture that is zero or more leading pictures that is RADL picture and zero RASL picture in decoding order, and CRA (CRA_NUT): NAL unit of an IRAP picture that is followed by one or more leading pictures that is RASL pictures and zero or more RADL pictures in decoding order.

The mapping from IRAP NAL unit types to SAP is as follows: CRA_NUT is SAP type 3.

When a picture with IDR_NUT type is encountered, the application should check the picture that follows the IDR picture in decoding order. If the following picture is a picture with LP_NUT, then the IDR picture is SAP 2. Else, the IDR picture is SAP 1. It is constrained that when a picture is IDR_NUT type, the picture that immediately follows IDR picture in decoding order shall be either picture with LP_NUT or Trailing NUT.

Figure 10:
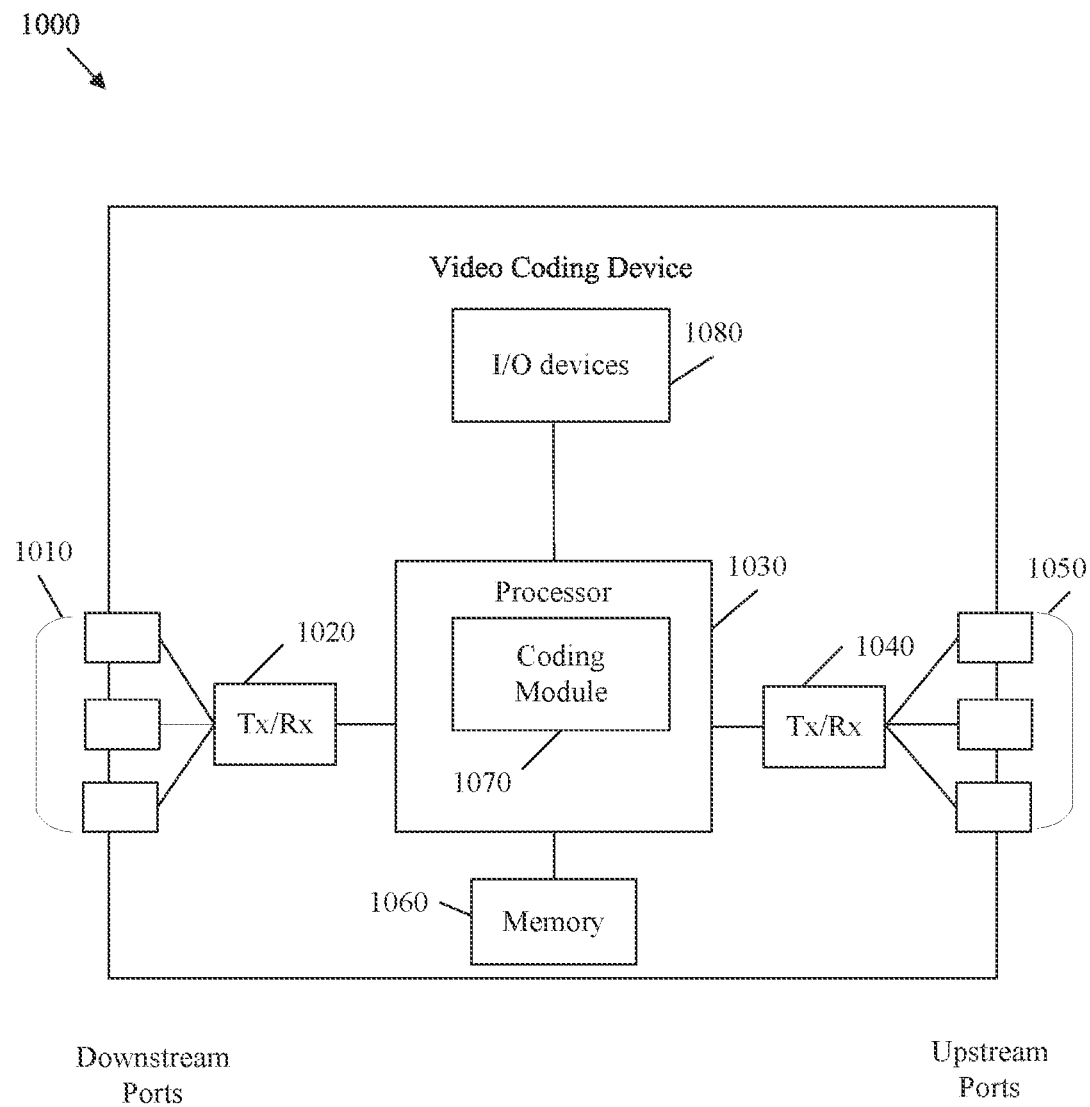
FIG. 10 is a schematic diagram of a video coding device.

FIG. 10 is a schematic diagram of a video coding device 1000 (e.g., a video encoder 20 or a video decoder 30) according to an embodiment of the disclosure. The video coding device 1000 is suitable for implementing the disclosed embodiments as described herein. The video coding device 1000 comprises ingress ports 1010 and receiver units (Rx) 1020 for receiving data; a processor, logic unit, or central processing unit (CPU) 1030 to process the data; transmitter units (Tx) 1040 and egress ports 1050 for transmitting the data; and a memory 1060 for storing the data. The video coding device 1000 may also comprise optical-to-electrical (OE) components and electrical-to-optical (EO) components coupled to the ingress ports 1010, the receiver units 1020, the transmitter units 1040, and the egress ports 1050 for egress or ingress of optical or electrical signals.

The processor 1030 is implemented by hardware and software. The processor 1030 may be implemented as one or more CPU chips, cores (e.g., as a multi-core processor), field-programmable gate arrays (FPGAs), application specific integrated circuits (ASICs), and digital signal processors (DSPs). The processor 1030 is in communication with the ingress ports 1010, receiver units 1020, transmitter units 1040, egress ports 1050, and memory 1060. The processor 1030 comprises a coding module 1070. The coding module 1070 implements the disclosed embodiments described above. For instance, the coding module 1070 implements, processes, prepares, or provides the various networking functions. The inclusion of the coding module 1070 therefore provides a substantial improvement to the functionality of the video coding device 1000 and effects a transformation of the video coding device 1000 to a different state. Alternatively, the coding module 1070 is implemented as instructions stored in the memory 1060 and executed by the processor 1030.

The video coding device 1000 may also include input and/or output (I/O) devices 1080 for communicating data to and from a user. The I/O devices 1080 may include output devices such as a display for displaying video data, speakers for outputting audio data, etc. The I/O devices 1080 may also include input devices, such as a keyboard, mouse, trackball, etc., and/or corresponding interfaces for interacting with such output devices.

The memory 1060 comprises one or more disks, tape drives, and solid-state drives and may be used as an overflow data storage device, to store programs when such programs are selected for execution, and to store instructions and data that are read during program execution. The memory 1060 may be volatile and/or non-volatile and may be read-only memory (ROM), random access memory (RAM), ternary content-addressable memory (TCAM), and/or static random-access memory (SRAM).

Figure 11:
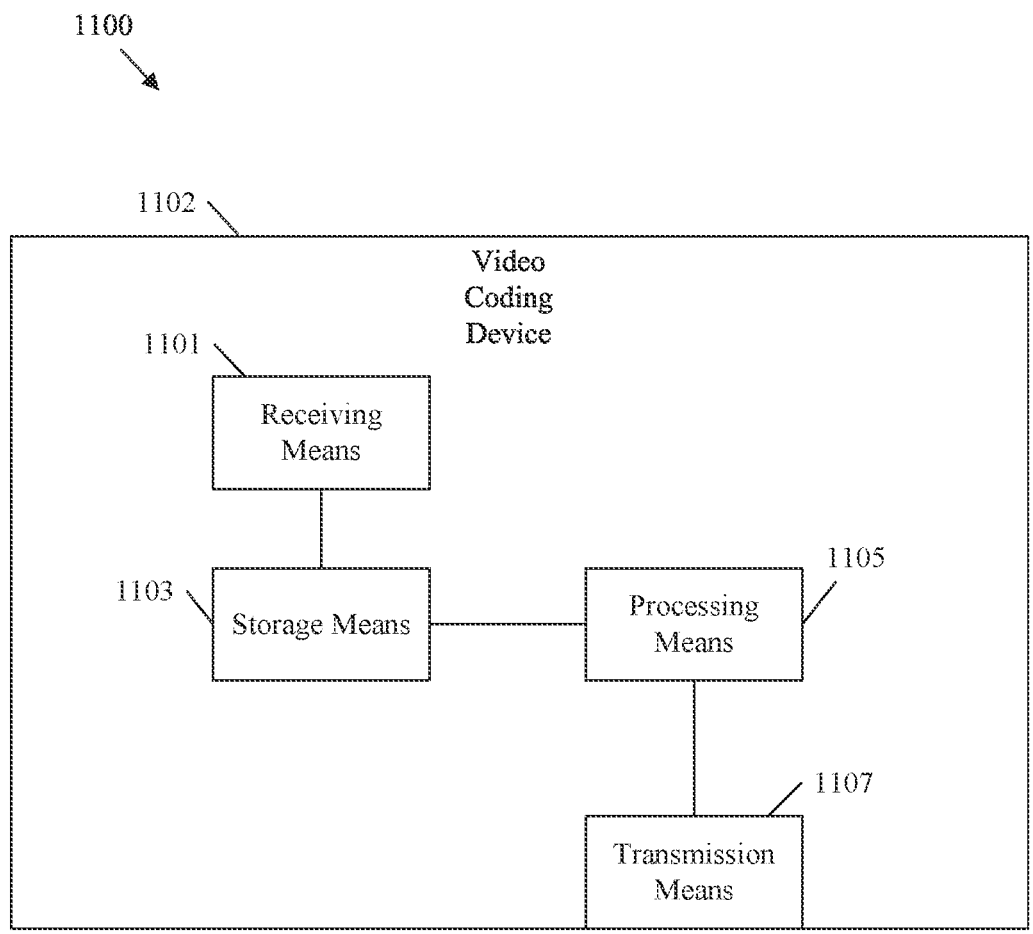
FIG. 11 is a schematic diagram of an embodiment of a means for coding.

FIG. 11 is a schematic diagram of an embodiment of a means for coding 1100. In embodiment, the means for coding 1100 is implemented in a video coding device 1102 (e.g., a video encoder 20 or a video decoder 30). The video coding device 1102 includes receiving means 1101. The receiving means 1101 is configured to receive a picture to encode or to receive a bitstream to decode. The video coding device 1102 includes transmission means 1107 coupled to the receiving means 1101. The transmission means 1107 is configured to transmit the bitstream to a decoder or to transmit a decoded image to a display means (e.g., one of the I/O devices 1080).

The video coding device 1102 includes a storage means 1103. The storage means 1103 is coupled to at least one of the receiving means 1101 or the transmission means 1107. The storage means 1103 is configured to store instructions. The video coding device 1102 also includes processing means 1105. The processing means 1105 is coupled to the storage means 1103. The processing means 1105 is configured to execute the instructions stored in the storage means 1103 to perform the methods disclosed herein.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of decoding a coded video bitstream implemented by a video decoder, comprising:

receiving, by a receiver of the video decoder, a coded video bitstream containing network abstraction layer (NAL) units;

assigning, by a processor of the video decoder, a presentation order for pictures contained in the NAL units based on tho NAL unit types of the NAL units, wherein the NAL unit types comprise a leading and trailing pictures NAL unit type, an intra random access point (IRAP) with random access decodable leading (RADL) NAL unit type, or an RAP with no leading pictures NAL unit type.

2. The method of claim 1, wherein the IRAP with RADL NAL unit type is determined for an TRAP picture that is followed by one or more RADL pictures and zero RADL pictures in decoding order.

3. The method of claim 2, wherein the TRAP picture is referred to as an instantaneous decoder refresh (IDR) picture with RADL picture.

4. The method of claim 2, wherein the TRAP with RADL NAL unit type is referred to as an instantaneous decoder refresh (IDR) with RADL NAL unit type.

5. The method of claim 1, wherein the IRAP with no leading pictures NAL unit type is determined for an TRAP picture that is not followed by a leading picture in decoding order.

6. The method of claim 5, wherein the TRAP picture is referred to as an instantaneous decoder refresh (IDR) picture without a leading picture.

7. The method of claim 5, wherein the TRAP with no leading pictures NAL unit type is referred to as an instantaneous decoder refresh (IDR) without leading pictures NAL unit type.

8. A decoder, comprising:
a memory storing instructions;
one or more processors coupled to the memory and configured to execute the instructions to cause the decoder to:
receive a coded video bitstream containing network abstraction layer (NAL) units;
assign a presentation order for pictures contained in the NAL units based on the NAL unit types of the NAL units, wherein the NAL unit types comprise a leading and trailing pictures NAL unit type, an intra random access point (IRAP) with random access decodable leading (RADL) NAL unit type, or an RAP with no leading pictures NAL unit type.

* * * * *

UNITED STATES PATENT AND TRADEMARK OFFICE
CERTIFICATE OF CORRECTION

PATENT NO. : 11,563,967 B2
APPLICATION NO. : 17/358491
DATED : January 24, 2023
INVENTOR(S) : FNU Hendry et al.

It is certified that error appears in the above-identified patent and that said Letters Patent is hereby corrected as shown below:

In the Claims

Column 35, Claim 1, Lines 48-49, through Column 36, Claim 8, Lines 1-47, should read:

1. A method of decoding a coded video bitstream implemented by a video decoder, comprising:
   receiving, by a receiver of the video decoder, a coded video bitstream containing network abstraction layer (NAL) units;
   assigning, by a processor of the video decoder, a presentation order for pictures contained in the NAL units based on NAL unit types of the NAL units, wherein the NAL unit types comprise a leading and trailing pictures NAL unit type, an intra random access point (IRAP) with random access decodable leading (RADL) NAL unit type, or an IRAP with no leading pictures NAL unit type.

2. The method of claim 1, wherein the IRAP with RADL NAL unit type is determined for an IRAP picture that is followed by one or more RADL pictures and zero RADL pictures in decoding order.

3. The method of claim 2, wherein the IRAP picture is referred to as an instantaneous decoder refresh (IDR) picture with RADL picture.

4. The method of claim 2, wherein the IRAP with RADL NAL unit type is referred to as an instantaneous decoder refresh (IDR) with RADL NAL unit type.

5. The method of claim 1, wherein the IRAP with no leading pictures NAL unit type is determined for an IRAP picture that is not followed by a leading picture in decoding order.

6. The method of claim 5, wherein the IRAP picture is referred to as an instantaneous decoder refresh (IDR) picture without a leading picture.

7. The method of claim 5, wherein the IRAP with no leading pictures NAL unit type is referred to as an instantaneous decoder refresh (IDR) without leading pictures NAL unit type.

Signed and Sealed this
Twenty-fifth Day of April, 2023

Katherine Kelly Vidal
*Director of the United States Patent and Trademark Office*

8. A decoder, comprising:
   a memory storing instructions;
   one or more processors coupled to the memory and configured to execute the instructions to cause the decoder to:
receive a coded video bitstream containing network abstraction layer (NAL) units;
   assign a presentation order for pictures contained in the NAL units based on NAL unit types of the NAL units, wherein the NAL unit types comprise a leading and trailing pictures NAL unit type, an intra random access point (IRAP) with random access decodable leading (RADL) NAL unit type, or an IRAP with no leading pictures NAL unit type.